United States Patent
Hirakawa et al.

(10) Patent No.: US 6,248,287 B1
(45) Date of Patent: Jun. 19, 2001

(54) CORRECTIVE TEMPERING APPARATUS FOR ROLLING ELEMENTS

(75) Inventors: Kiyoshi Hirakawa; Akitoshi Maeda; Hiroaki Sugiyama; Manabu Ohhori, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/449,676

(22) Filed: Nov. 30, 1999

Related U.S. Application Data

(62) Division of application No. 08/632,418, filed as application No. PCT/JP95/01662 on Aug. 23, 1995, now Pat. No. 6,093,268.

(30) Foreign Application Priority Data

Aug. 24, 1994 (JP) .................................................. 6-199620

(51) Int. Cl.⁷ ........................................................ C21D 9/00
(52) U.S. Cl. ............................................ 266/249; 219/633
(58) Field of Search .......................... 266/249; 219/633; 148/646, 647

(56) References Cited

U.S. PATENT DOCUMENTS

| | | | |
|---|---|---|---|
| 1,894,590 | 1/1933 | Ingersoll | 266/119 |
| 4,479,833 | 10/1984 | Gessinger et al. | 148/567 |
| 5,410,132 | 4/1995 | Gregg et al. | 219/604 |
| 5,591,369 * | 1/1997 | Matsen et al. | 219/633 |

FOREIGN PATENT DOCUMENTS

| | | | |
|---|---|---|---|
| 56-9217 B2 | 2/1981 | (JP) | |
| 58-35575 B2 | 8/1983 | (JP) | |
| 59-226118 | 12/1984 | (JP) | |
| 62-37315 | 2/1987 | (JP) | |
| 1252363 | 8/1986 | (SU) | 148/645 |

* cited by examiner

*Primary Examiner*—Scott Kastler
(74) *Attorney, Agent, or Firm*—Sughrue, Mion, Zinn, Macpeak & Seas, PLLC

(57) ABSTRACT

In a corrective tempering method and apparatus for a rolling element in which the thermal deformation of the rolling element is corrected within an extremely short time by utilizing plasticity exhibited during a metallic structure transforming process brought about by low-temperature tempering of the rolling element made of steel, the hardened rolling element is heated and pressured to a maximum temperature within a range of from 250 to 500° C. by a heating device while set in correcting molds to correct the deformation of the rolling element at a degree of working within a range not exceeding an elastic deformation range of the rolling element at a room temperature. The rolling element can be heated also by an induction heating device in addition to a conduction heating device. A product whose inner/outer diameter correcting degree of deformation is 60% or more, dimension standardizing rate is 30% or more, surface roughness is less than Ra 0.2 μm, and surface hardness is HRC 56 or more can be obtained for a correction time within 6 minutes and an induction heating time within 30 seconds.

6 Claims, 16 Drawing Sheets

FIG. 13A
FIG. 13B
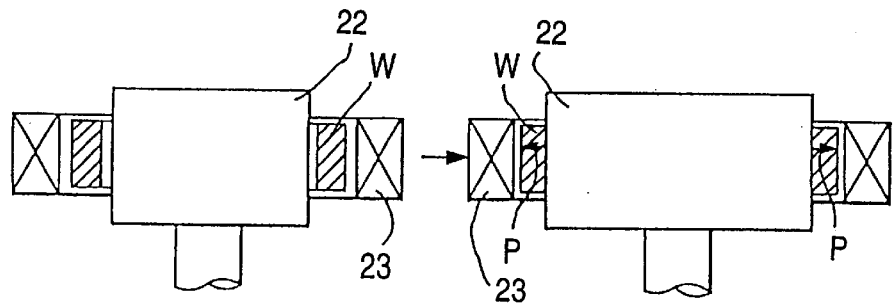
FIG. 14
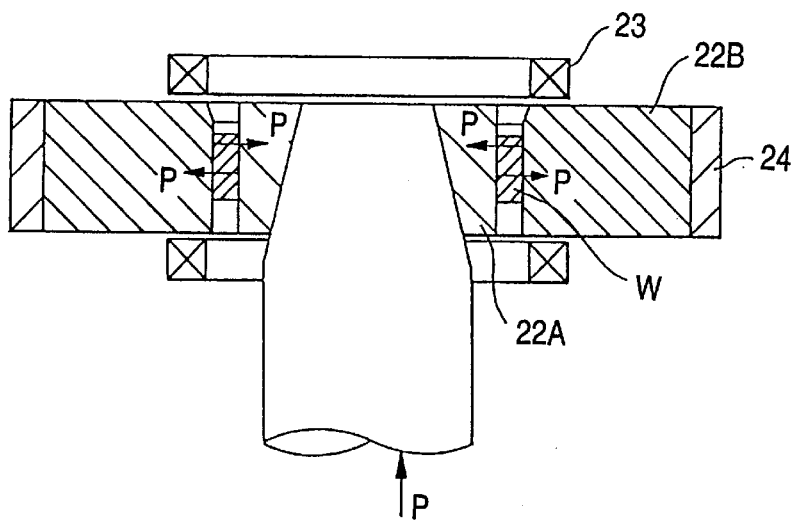
FIG. 15A
FIG. 15B
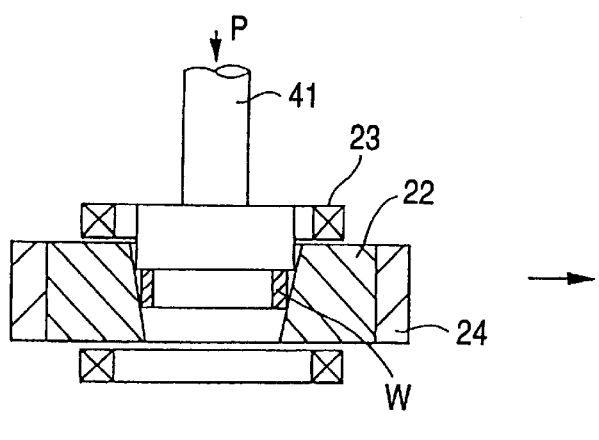
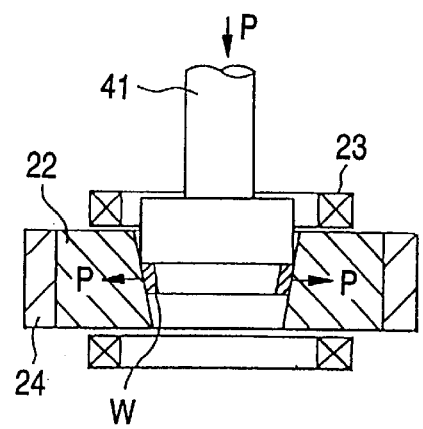

CORRECTIVE TEMPERING APPARATUS FOR ROLLING ELEMENTS

This is a divisional of Application No. 08/632,418 filed Apr. 24, 1996 now U.S. Pat. No. 6,093,268, the disclosure of which is incorporated herein by reference which is a 371 of PCT/JP95/01662 filed Aug. 23, 1995.

BACKGROUND OF THE INVENTION

The present invention relates to an improvement of a corrective tempering method and apparatus for correcting the hardening deformation of rolling elements.

In the process of manufacturing rolling elements such as the inner and outer races, cages, and other parts of, e.g., rolling bearings, the deformation of the rolling elements induced by such a heat treatment as hardening has heretofore been corrected by tempering. Conventional tempering methods include so-called "bracing tempering" and press tempering. The former method is characterized as correcting the deformation of a rolling element by subjecting the rolling element to such a normally tempering treatment as keeping the rolling element in the tempering furnace at a required temperature for 60 to 120 minutes with the rolling element being given a reversely bracing deformation using an appropriate tool. On the other hand, the press tempering method is characterized as correcting the deformation of a rolling element by subjecting the rolling element to the aforementioned normally tempering treatment with the rolling element pressured by molds or the like before the tempering treatment.

However, the conventional tempering methods address several problems. One problem is that the treatment time required for correcting the deformation of a rolling element is very long, not only because these methods involve the step of preparing and setting tools, molds, and the like in consideration of the size and amount of deformation of the rolling element to be corrected and pressuring the rolling element with these tools and molds, but also because the rolling element is thereafter subjected to the normally tempering treatment for 60 to 120 minutes in the furnace. More specifically, the following problems have been encountered.

(1) A number of tools and molds must be involved to treat a number of rolling elements on a mass production basis. Therefore, the conventional arts that are of low productivity cannot respond to the needs for mass production.

(2) Further, the tempering furnace, being heated with hot blast, takes 20 minutes or more for heating a rolling element, and there is a limit in shortening the treatment time imposed by this slow heating of the rolling element.

(3) Still further, if atmosphere temperature is increased to shorten the treatment time, the hardness of the rolling element is reduced.

(4) Still further, the heat-treated rolling element still holds inconsistencies caused in turning before the heat treatment, which in turn requires that grinding margins after the heat treatment be increased. As a result, grinding cost reduction is restricted.

SUMMARY OF THE INVENTION

The present invention has been made to overcome conventional problems. Therefore, the object of the invention is to provide a corrective tempering method and apparatus for rolling elements that can correct the heat-treatment deformation of the rolling elements within an extremely short time by utilizing plasticity exhibited during the metallic structure transforming process brought about by low-temperature tempering of the rolling elements that are made of steel.

To achieve the above object, a method according to the invention is achieved by a method of correctively tempering a rolling element of one of a hardened cylindrical element and a hardened annular element, the method including the steps of: inserting the rolling element into a mold to work at least one surface of an inner diameter surface and an outer diameter surface of the rolling element; and heating the rolling element for a heating time within six minutes to a maximum rolling element temperature within 250 to 500° C. to correct a hardening deformation of the rolling element.

Further, an apparatus according to the invention is achieved by an apparatus for correctively tempering a rolling element, which provides: an induction heater heating the rolling element to a desired temperature and including a heating coil; a mold constraining at least one of an inner surface, an outer surface of the rolling element and both of the inner and outer surfaces, the rolling element being at least one of a hardened cylindrical element and a hardened annular element; and a mold temperature adjusting device arranged relative to the heating coil for adjusting a temperature of the mold, the mold temperature adjusting device being positioned outside the heating coil in at least one direction of a radial direction and an axial direction of the heating coil.

BRIEF DESCRIPTION OF THE DRAWINGS

FIG. 8A is a sectional view in the case of a doughnutlike rolling element; and FIG. 8B is a sectional view in the case of an annular rolling element;

FIGS. 13A and 13B each is a sectional view showing a main portion in a fifth embodiment of the corrective tempering apparatus; FIG. 13A shows the main portion before heating; FIG. 13B shows the main portion after heating;

FIG. 14 is a sectional view showing a main portion in a sixth embodiment of the corrective tempering apparatus;

FIGS. 15A and 15B each is a sectional view showing a main portion in a seventh embodiment of the corrective tempering apparatus; FIG. 15A shows the main portion before heating; FIG. 15B shows the main portion after heating;

DETAILED DESCRIPTION OF THE INVENTION

Figure 1:
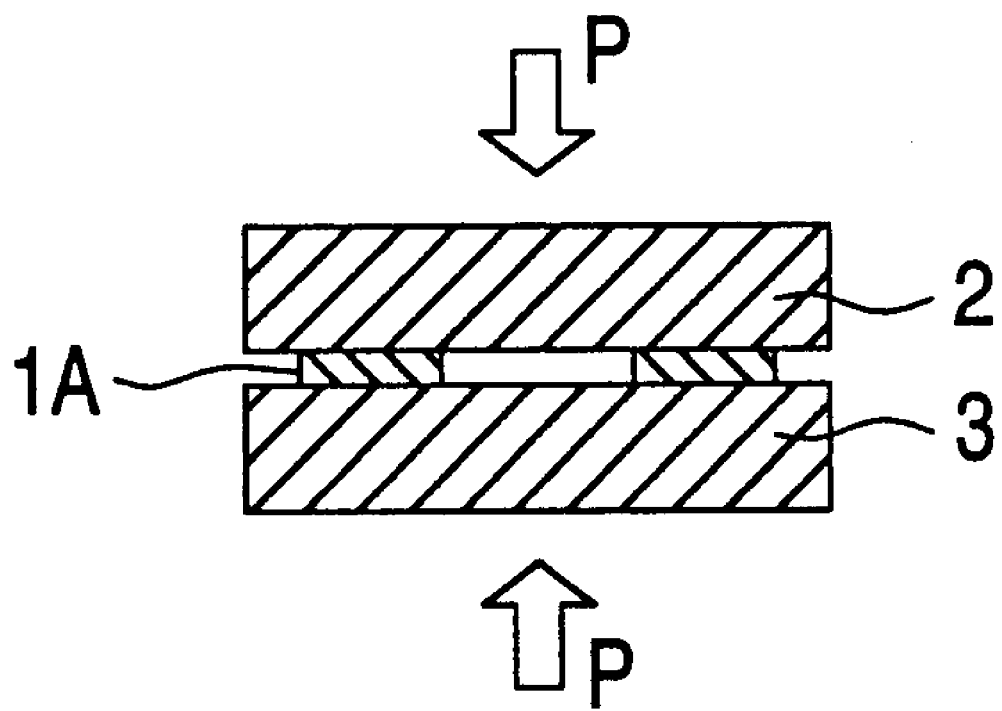
FIG. 1 is a sectional view of a first embodiment illustrative of a mode of heating and pressuring method of the invention.

Details of the present invention will hereinafter be described.

The inventors have positively made a study to overcome problems addressed by the conventional corrective tempering methods and apparatuses. As a result of the study, it was found out that corrective tempering can be implemented within an extremely short time (in the order of seconds) by (1) pressuring a rolling element to be corrected using a mold that has been heated to a predetermined temperature by a conduction heating device, and heating and pressuring the rolling element while transmitting the heat of the mold to the rolling element by conduction or by (2) heating and pressuring a rolling element to be corrected while pressuring the rolling element by a mold with the rolling element being heated to a predetermined temperature directly by an electromagnetic induction heating device. Hence, the inventors have found out that the deformation of a rolling element can be corrected within a short time with a smaller reduction in hardness compared with the corrective tempering methods using a conventional furnace.

That is, the invention is characterized in that carbon dissolved in martensite immediately after the hardening of a rolling element made of steel is precipitated and diffused as $\epsilon$-carbides by heating the rolling element to 250 to 500° C. and that toughness is imparted to the rolling element by transforming the martensite from the tetragonal to the cubic. And post-treatment deformation of the rolling element such as warpage as well as pre-treatment mechanically produced dimensional inconsistencies are corrected by utilizing plasticity exhibited during this process.

Thus, in the corrective tempering method for rolling elements according to the invention, the amount of deformation such as warpage, dimensions, and the like can be controlled within a prescribed value and, at the same time, hardness is kept so as not to be reduced below HRC 56 which is required for the rolling element in order to maintain the rolling fatigue life.

Steel materials of which rolling elements of the invention are made are: carbon steels containing 0.5wt % or more of carbon, bearing steels containing about 1% of carbon, or case hardening steels containing 0.5wt % or less of carbon before case hardening and 0.6wt % or more of carbon in the case after case hardening. These steel materials are used either singly or in combination.

The reasons why the deformation correcting temperatures are set to values between 250 and 500° C. are as follows.

In the case of using bearing steels and case hardening steels in particular, deformation correction within a short time (within 6 minutes when mass production of the rolling elements is considered) is hard if the mold temperature is less than 250° C. On the other hand, at a mold temperature exceeding 500° C. in the case of conduction heating, not only hardness is reduced from HRC 56 that is required for bearings although the amount of deformation corrected remains unchanged, but also the durability of the mold is impaired. Therefore, mold temperatures ranging from 250 to 500° C. are desirable from the viewpoint of the control of product heating temperature. However, even if the mold temperature exceeds 500° C. (e.g., also 700° C.), such mold temperature is allowed as long as a rolling element is tempered at a maximum rolling element temperature within a range of from 250 to 500° C. for a time not exceeding 6 minutes.

Further, a corrective tempering time not exceeding 6 minutes is desired because the heating time must match the hardening speed of a rolling element during the manufacturing process.

The corrective tempering methods are characterized in that: after a cylindrical or annular rolling element has been subjected to hardening, the thus hardened rolling element is inserted into a mold whose temperature has already been adjusted; and the rolling element is then subjected to tempering by heating using a heating device to a high temperature within a range of from 250 to 500° C. for a short time with at least one of the outer surfaces (the outer diameter surface, the inner diameter surface, both end faces) of the rolling element bound by the mold. Conduction heating or induction heating is employed as the heating device.

In the case of induction heating, the heating time is within 30 seconds, which is thus advantageous in quickening the tempering treatment. In this case, the mold is preferred to be made of a material less affected by high frequencies. A material whose magnetic permeability is 1.5 or less is desirable; e.g., ceramic is desirable. The reason therefor is that corrective tempering can be implemented precisely, quickly, as well as reliably because such a material can prevent the mold temperature from increasing due to lines of magnetic force produced by the induction heating coil, so that the mold temperature can be controlled independently of the induction heating source.

Further, the mold must have a required strength. Materials other than ceramic capable of meeting these requirements are: nonmagnetic steels, aluminum, brass, and copper.

The expansion coefficient of a ceramic mold is about ⅕ that of a steel mold. Therefore, a rolling element within the induction-heated mold is thermally expanded to be compressed and corrected strongly by the ceramic mold. At the same time, the rolling element precipitates and diffuses ε-carbides from the martensite at the time of hardening due to the effect of tempering, so that tempering is completed with the structural transformation.

According to the corrective tempering methods for rolling elements according to the invention, the deformation of a rolling element induced by hardening can be corrected by utilizing plasticity exhibited during the process of tempering the hard steel structure produced in the hardened rolling element. That is, the deformation can be corrected within an extremely short time. In addition, a minimum hardness of HRC 56 required to maintain the rolling fatigue life of a rolling element can be ensured, and the amount of warpage or deformation in the outer or inner diameter required to guarantee product accuracies can be controlled under a prescribed value. Moreover, a number of rolling elements can be manufactured on a mass production basis with a small number of tools and molds.

Still further, the corrective tempering methods of the invention can standardize the dimensions of rolling elements, which in turn contributes to improving roundness and inclination. Still further, the surface roughness of a rolling element can be improved by increasing the margin of fit between the rolling element and the mold. More specifically, such requirements as a correcting degree of deformation of 60% or more, a surface hardness of HRC 56 or more, a corrected surface roughness of Ra 0.2 $\mu$m or less, and a dimension standardizing rate of 30% or more can be achieved by the invention.

The corrective tempering apparatus of the invention is characterized in that: the induction heater is employed as a source for heating a rolling element, and that the mold temperature adjusting device is arranged outside the heating coil of the induction heater, so that the mold temperature can be controlled independently of the induction heating source, which in turn achieves precise, quick, and reliable corrective tempering of the rolling element.

The temperature adjuster, which is the mold temperature adjusting device of the corrective tempering apparatus of the invention, is constructed of a temperature control panel with a temperature sensor and a temperature adjusting source embedded therein. The temperature adjusting source is formed by either one of an electric heater or a heat medium solution circulation path alone or in combination with a cooling device such as a cooling water circulation path. The temperature adjusting panel is made, e.g., of a steel plate. The temperature adjusting panel may also be made of a metal that exhibits good heat conductivity including ceramic such as SiC, copper, and aluminum. This temperature control panel is arranged so as to be in intimate contact with the correcting mold, and the temperature of the mold is adjusted to a required temperature by the temperature sensor and the temperature adjusting source. If the correcting mold is made of ceramic, such mold is not heated by high frequencies from the induction heating source because the magnetic permeability of the mold is 1.5 or less. Therefore, the mold can be kept precisely at a required temperature only by adjusting the mold temperature adjusting device to a predetermined temperature.

Precise, quick, and reliable corrective tempering of a rolling element can be implemented by the corrective tempering apparatus of the invention while utilizing this function of the mold temperature adjusting device. That is, (1) If the mold temperature adjusting device is set to a temperature that will adjust the mold temperature in such a manner a rolling element, which is a workpiece heated by the induction heater, is not thermally expanded to be in intimate contact with the mold, the workpiece can be set in the mold quickly under low forcing pressure.

Further, the induction-heated workpiece is cooled through conduction of the heat thereof to the ceramic mold whose temperature has been adjusted by the mold temperature adjusting device, which in turn allows the workpiece to be dropped naturally from the mold due to thermal shrinkage. As a result, the workpiece is no longer required to be forcibly extracted out of the mold with an extracting press. Hence, the temperature of the ceramic mold is controlled independently by the mold temperature adjusting device, which in turn allows the operation of setting the workpiece in and taking the workpiece out of the mold to be completed within an extremely short time. This is a remarkable advantage for a continuous process.

(2) In the corrective tempering apparatus of the invention, a ratio of volume between a workpiece to be treated and a ceramic mold is set to 1 to 100 or so from the viewpoint of strength. However, when heat treatment is performed only by induction heating without employing the mold temperature adjusting device, induction heating efficiency is reduced because the heat conduction from the induction-heated workpiece to the non-induction-heated ceramic mold is large. Further, an inconsistent temperature distribution between a workpiece portion that is in contact with the mold and a workpiece portion remote from the mold brings about a problem of inconsistent product quality. If, on the other hand, the temperature of the ceramic mold is controlled independently by the mold temperature adjusting device, efficient and uniform induction heating can be implemented. Thick-walled annular bodies, in particular, are more susceptible to tempering quality inconsistency with larger difference between the mold temperature and the workpiece temperature at the time of heating. In such a case, tempering quality inconsistency can be suppressed as small as possible by heating the rolling element mainly through conduction heating from the mold with the mold temperature being kept at a high temperature by the mold temperature adjusting device. That is, by adjusting the ratio of induction heating to conduction heating, heat treatment conditions optimal to the shape of the workpiece and the treatment tact can be selected.

Next, preferred embodiments of the invention will be described.

In a first embodiment of the invention shown in FIG. 1, a rolling element 1A has a flat doughnutlike shape with an outer diameter of 40 mm, an inner diameter of 18 mm, and a thickness of 1.2 mm, and is made of a high carbon bearing steel (SUJ2 according to Japanese Industrial Standard) containing 0.95 to 1.10% of carbon. The hardness of the rolling element 1A after hardening is HRC 66. The rolling element 1A that has been hardened was subjected to a warpage correcting treatment to correct the warpage produced during the hardening. The warpage correcting treatment was carried out by interposing the rolling element 1A between heated upper and lower molds 2, 3 and holding the element 1A for a predetermined time with a pressure P equal to 1 ton applied from both top and bottom.

Figure 2:
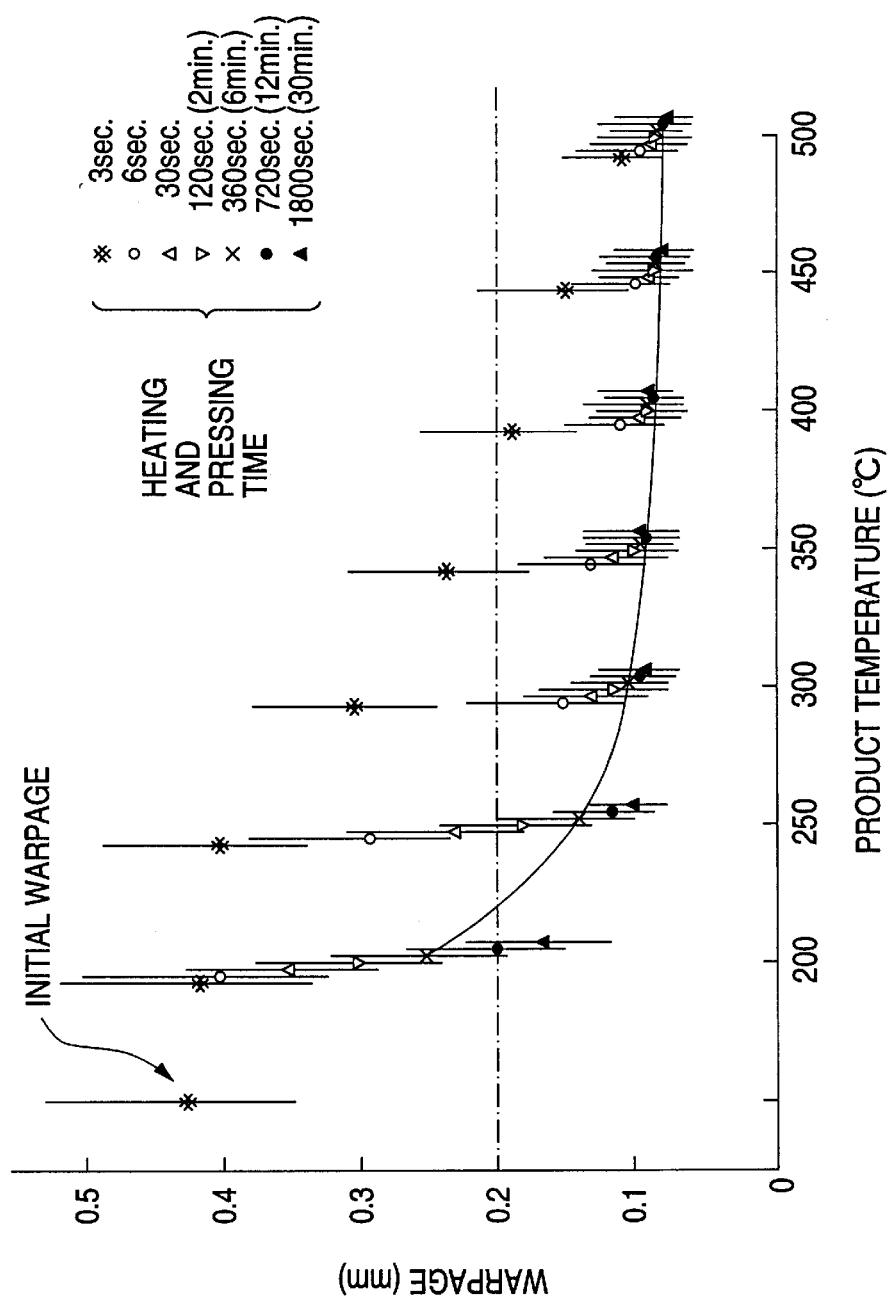
FIG. 2 is a diagram illustrating a relationship among product temperature, correcting degree of deformation and pressuring and heating time in a corrective tempering method, which is the first embodiment of the invention.

FIG. 2 shows deformation correcting temperature, i.e., maximum temperature reached by the rolling element 1A (hereinafter referred to as the "product temperature") in function of the amount of warpage of the rolling element 1A with heating and pressuring time as a parameter. That is, FIG. 2 shows the results of measurements made when the rolling element 1A made of a bearing steel was subjected to a corrective tempering treatment by pressure. The initial amount of warpage of the rolling element 1A before the treatment was 0.43±0.09 mm. As is apparent from FIG. 2, a satisfactory deformation correction was made by heating the product to 250° C. or more. That is, by heating the product to 250° C. or more, a warpage requirement of the product of 0.2 mm or less (the maximum allowable warpage) was met for a heating and pressuring time not exceeding 6 minutes.

Figure 3:
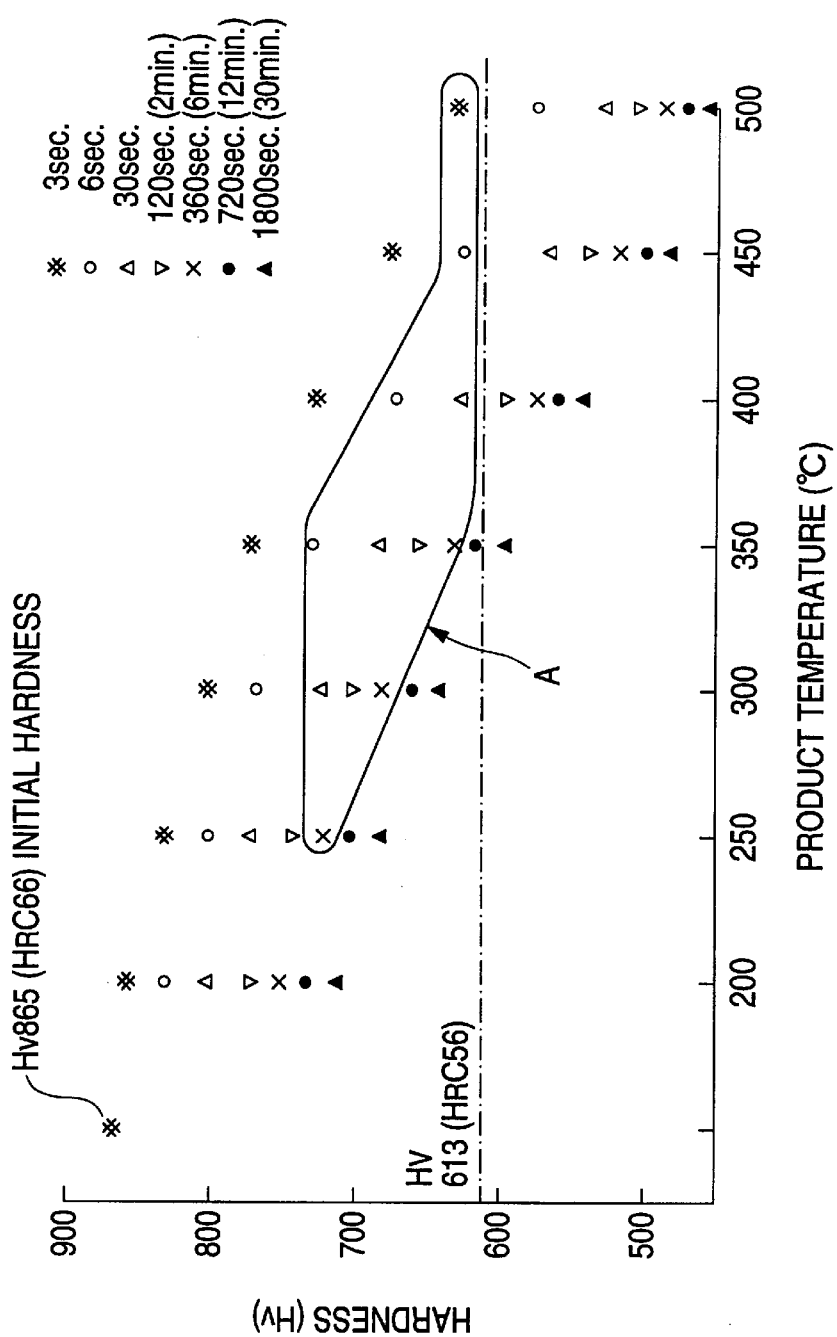
FIG. 3 is a graph illustrating a relationship among product temperature, rolling element hardness, and pressuring and heating time in the first embodiment of the invention.

FIG. 3 shows product temperature in function of rolling element 1A hardness with the heating and pressuring time as a parameter in the aforementioned case. As is apparent from FIG. 3, the higher the mold temperature and the longer the heating and pressuring time, the lower the hardness. Therefore, a satisfactory deformation correction can be made within a range A defined in FIG. 3. The range A ensures for the rolling element a hardness of HRC 56 or more with pressure being applied for such a short time as not exceeding 6 minutes.

Figure 4:
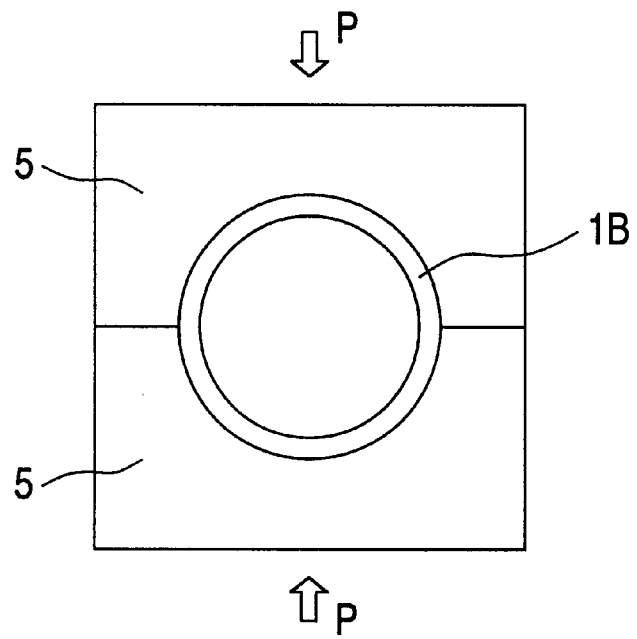
FIG. 4 is a sectional view of a second embodiment illustrative of a mode of heating and pressuring method of the invention.

FIG. 4 shows a second embodiment of the invention. An annular rolling element 1B (e.g., the outer race of a rolling bearing) is heated and pressured by applying a pressure P from sideways (orthogonal to the axis of the rolling element) using a correcting split mold 5 that has already been heated to a predetermined temperature. In this case, the deformation of the outer diameter is corrected by binding the outer diameter surface of the rolling element 1B. It may be noted that deformation correction using the split mold can be applied also to the doughnutlike rolling element 1A, which is the first embodiment.

Figure 5:
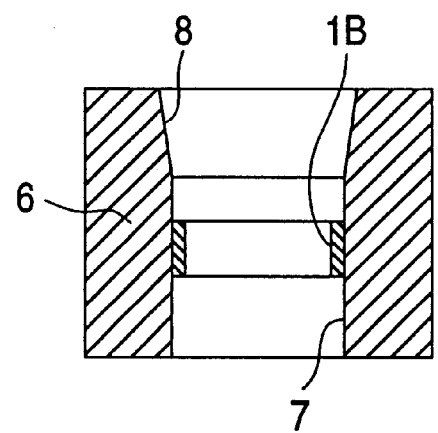
FIG. 5 is a sectional view of a third embodiment illustrative of a mode of heating and pressuring method of the invention.

FIG. 5 shows a third embodiment of the invention. The annular rolling element 1B is forced into a hole 7 of a die 6 to correct deformation. The die 6 has predetermined dimensions and serves as a correcting mold. The rolling element 1B has the deformation of the outer diameter thereof corrected with a pressure applied from sideways while passing though the tapered portion 8 of the already heated hole 7.

Figure 6:
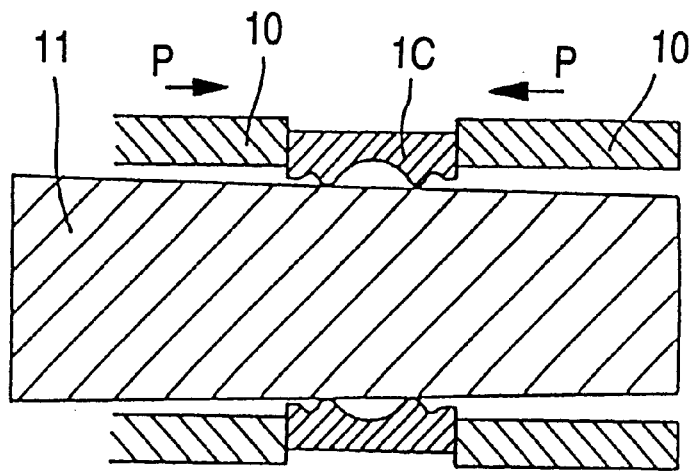
FIG. 6 is a sectional view of a fourth embodiment illustrative of a mode of heating and pressuring method of the invention.

FIG. 6 shows a fourth embodiment of the invention. The outer race (or the inner race) of a ball bearing 1C, which is a rolling element, has the deformation thereof produced by hardening corrected. In this case, the deformation is corrected by not only applying a pressure P to both end faces of the outer race of the ball bearing 1C with already heated cylindrical pressing molds 10, 10, but also pushing an already heated mold 11, which is a tapered shaft or a straight shaft, into the center bore of the outer race of the ball bearing 1C. As a result of this operation, the warpage on the end faces of the outer race of the ball bearing 1C as well as the deformation of the inner diameter thereof can be corrected simultaneously.

Further, if the warpage on the end faces is not so serious, only one mold 10 may be used in order to push the outer race of the ball bearing 1C so as to allow the already heated mold 11 to be inserted into the outer race, instead of causing both sides of the outer race to be pressured by the already heated pressing molds 10, 10. In this case, the other pressing mold 10 is abutted against one end face of the outer race of the ball bearing 1C through, e.g., a spring and is used only for heating the outer race of the ball bearing 1C. Thus, the other pressing mold 10 may not necessarily be required to be used.

Figure 7:
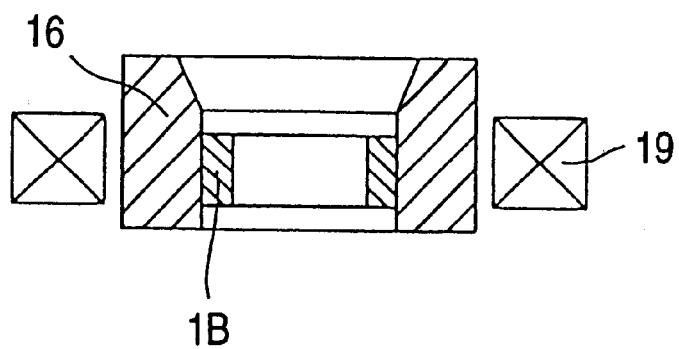
FIG. 7 is a sectional view of a fifth embodiment illustrative of a mode of heating and pressuring method of the invention.

FIG. 7 shows a fifth embodiment of the invention. The deformation of the outer diameter of the rolling element 1B is corrected by inserting the rolling element 1B into a pressuring mold 16 made of ceramic (e.g., alumina, SiC, $Si_3N_4$, or diamond), thereafter heating the rolling element 1B using an inductor coil 19 arranged outside the pressuring mold 16, so that the deformation of the outer diameter can be corrected by the fitting force as well as the pressuring force produced between the rolling element 1B and the pressuring mold 16 by the thermal expansion of the rolling element 1B.

In either one of the aforementioned embodiments, not only the amount of deformation such as warpage can be controlled within a prescribed value corresponding to the size of a rolling element, but also hardness can be maintained at HRC 56 or more by a quick treatment.

Figure 8A:
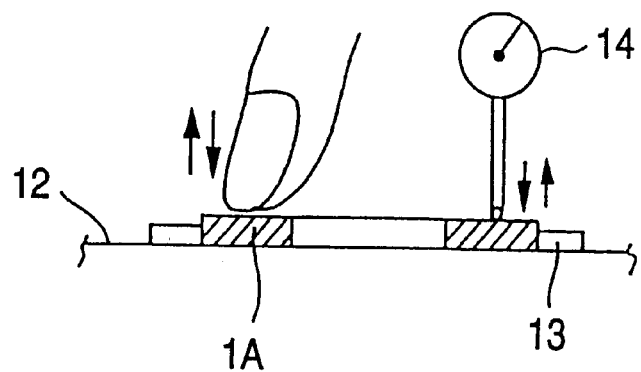
FIGS. 8A and 8B are diagrams illustrative of a method of measuring the amount of warpage of rolling elements.
Figure 8B:
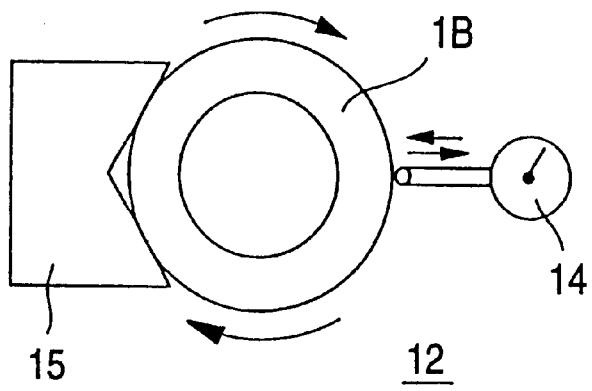

It may be noted that an exemplary method of measuring the amount of warpage is shown in FIGS. 8A and 8B.

FIG. 8A shows a case where the amount of deformation of the doughnutlike rolling element 1A is measured. The amount of vertical movement of one end of the rolling element 1A is measured with a dial gauge 14 by placing the rolling element 1A on a surface plate 12 and biasing the opposite end of the rolling element 1A intermittently with a finger tip with the outer diameter surface of the rolling element 1A held by a locating ring 13 to prevent horizontal displacement.

FIG. 8B shows a case where the amount of deformation of the annular rolling element 1B is measured. The amount of deformation of the outer diameter is measured with the dial gauge 14 by rotating the rolling element 1B in such a manner as shown in FIG. 8B while placing the rolling element 1B on the surface plate 12, bringing one end of the outer diameter surface of the rolling element 1B into contact with a V block 15 fixed on the surface plate 12 at two points, and bringing the outer diameter surface on the other end into contact with the dial gauge 14 at one point.

It may be noted that the method of heating the heating and pressuring mold in each of the aforementioned embodiments is not particularly limited. A method in which a mold whose heat capacity is large is heated in a furnace in advance, a method in which a mold incorporating a heating source therein is heated by the heating source, an induction heating method, or a like method may be selected arbitrarily.

Still further, it is required that a mold already heated to a predetermined temperature be kept heated for a predetermined time (within 6 minutes). Therefore, the heated mold is placed in a heated atmosphere so that correction by pressure may be effected in such heated atmosphere.

Still further, correction by pressure may also be effected by using a pressuring mold made of ceramic and heating the rolling element through induction heating from outside such pressuring mold.

Next, corrective tempering apparatuses according to the invention will be described.

Figure 9:
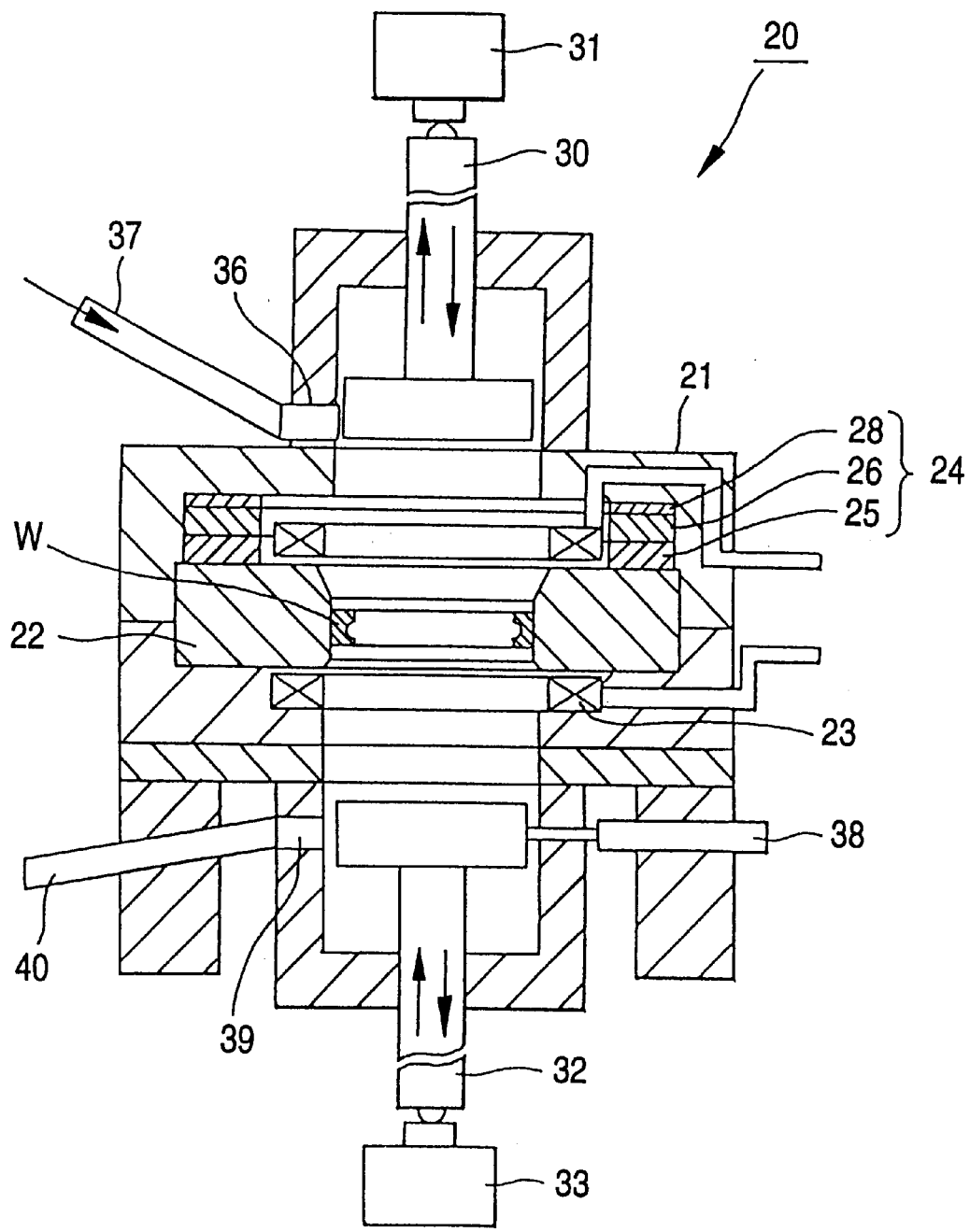
FIG. 9 is a sectional view of a first embodiment of a corrective tempering apparatus according to the invention.

FIG. 9 is a first embodiment of the corrective tempering apparatus according to the invention. A cylindrical ceramic mold 22 whose magnetic permeability is 1.5 or less is set in a main body 21 of a corrective tempering apparatus 20. A workpiece W, which is an annular rolling element, is inserted into the inner diameter surface of the mold 22 with the outer diameter surface thereof bound. Induction heating coils 23 serving as workpiece heating device are arranged on both upper and lower end faces of the mold 22 in proximity. In this case, the mold 22 is made as thin as possible so that the induction heating coils 23 can be arranged as close to the workpiece W to be heated as possible. In addition, each coil has two turns so that the workpiece W can be heated uniformly from both ends thereof by induction heating. The inner diameter of each coil 23 is made slightly larger than the inner diameter of the mold 22.

A mold temperature adjuster 24 serving as a mold temperature adjusting device for adjusting the temperature of the mold 22 is arranged outside one of the heating coils 23, which is the induction heating source, in the radial direction of the coil 23 so as to be in intimate contact with the upper end face of the ceramic mold 22. The mold temperature adjuster 24 of this embodiment is formed into a flat doughnutlike shape. The mold temperature adjuster 24 includes a steel (SC) panel 25, a temperature adjusting source 26, and a not shown temperature sensor 27. The steel panel 25 is used as a conducting member for conducting heat satisfactorily. The temperature adjusting source 26 such as an electric heater or a heat medium solution and the temperature sensor 27 such as a thermocouple are incorporated in the mold temperature adjuster. The upper surface of the mold temperature adjuster is covered with an insulating material 28. The flat surface of the steel panel 25 is arranged so as to be in intimate contact with the flat surface of the mold 22.

Up to a mold temperature of about 300° C., the mold temperature adjuster 24 is of such type that a heat medium oil is circulated in a coil-like groove formed inside the mold temperature adjuster 24 or that an electric heater is embedded inside the mold temperature adjuster 24. If the mold temperature exceeds 300° C., it is preferred that the mold temperature adjuster 24 be of the latter type (electric heater type), because the heat medium oil type addresses a problem of heat deterioration. If cooling is required to keep mold temperature constant, water or oil is circulated in the coil-like groove formed in the mold temperature adjuster 24. Temperature control is effected by making a changeover between the heating source and the cooling source based on a detection signal from the temperature sensor 27 embedded in the mold temperature adjuster 24.

Although close to the induction heating coils 23, the mold 22 is made of ceramic whose magnetic permeability is 1.5 or less and the mold 22 will not therefore be further heated by the lines of magnetic force produced by the induction heating coils 23. Hence, the mold 22 temperature can be adjusted by the mold temperature adjuster 24 alone.

Not only a workpiece forcing tool 30 and a main cylinder 31 for vertically moving the workpiece forcing tool 30 are arranged at the upper end, but also a workpiece supporting tool 32 and a sub-cylinder 33 for vertically moving the workpiece supporting tool 30 are arranged at the lower end along the center shaft of the apparatus main body 21.

Further, a workpiece W insertion port 36 and an insertion chute 37 are arranged on an upper side surface of the apparatus main body 21, whereas a workpiece discharge cylinder 38, a treated workpiece discharge port 39, and a treated workpiece discharge chute 40 are arranged on a lower side surface of the apparatus main body 21.

An operation of the corrective tempering apparatus 20 will be described next.

The workpiece forcing tool 30 and the workpiece supporting tool 32 are first set in the upper and lower evacuated positions, respectively.

The workpiece supporting tool 32 is elevated to the workpiece insertion port 36 on the upper side of the apparatus by operating the sub-cylinder 33 on the lower side of the apparatus. Then, a workpiece W is charged onto the workpiece supporting tool 32 from the insertion chute 37 via the workpiece insertion port 36. It is so designed that the charged workpiece W is automatically aligned with the mold 22.

Once the workpiece W has been charged onto the workpiece supporting tool 32, the workpiece forcing tool 30 is lowered by operating the main cylinder 31 so that the workpiece W is clamped between both tools 30, 32. The tools 30, 32 are lowered with the workpiece W horizontally clamped therebetween, pass through the upper induction heating coil 23, and are forced into the middle portion of the mold 22 from the upper tapered portion of the inner diameter surface of the ceramic mold 22. After being forced, the workpiece forcing tool 30 is elevated, whereas the workpiece supporting tool 32 is lowered to move away from the workpiece W. The workpiece W is subjected to induction heating by operating the induction heating coils 23 under this condition. It is preferred that the maximum workpiece W temperature range from 250 to 500° C. and that the induction heating time for keeping the workpiece at such maximum temperature not exceed 30 seconds. Even if the workpiece W is heated for more than 30 seconds, the effect of tempering and deformation correcting capability will not be improved. That is, heating for a time exceeding 30 seconds will be wasted.

Upon end of the heating, the workpiece forcing tool 30 is lowered to a large extent to push the workpiece W out toward the lower portion of the mold 22 by operating the main cylinder 31, and the workpiece W is received by the elevated workpiece supporting tool 32. Then, the workpiece supporting tool 32 is lowered so that the workpiece W is located at the workpiece discharge port 39. The workpiece W on the workpiece supporting tool 32 is thereafter thrown out onto the workpiece discharge port 39 and sent to the discharge chute 40 by operating the workpiece discharge cylinder 38. As a result of these steps, one cycle of the operation is completed.

If induction heating efficiency is improved, or if a small-capacity high frequency power source is used for the workpiece, it is suggested that induction heating be effected by interposing highly permeable members between the workpiece forcing tool 30 and a corresponding contact surface of the workpiece W and between the workpiece supporting tool 32 and the corresponding other contact surface of the workpiece W with the workpiece interposed between both tools. By first induction-heating the highly permeable members to a high temperature and then by utilizing the heat conduction effect of the induction heating, the workpiece W is heated with high efficiency.

Further, according to the corrective tempering apparatus 20, the workpiece W can also be subjected to an ironing process inside the ceramic mold 22 during the heating in order to improve the surface roughness of the outer diameter surface of the workpiece W.

FIGS. 10 to 16 show various embodiments of the invention, which are modifications of the apparatus, and modes of arrangement of the correcting mold 22, the induction heating coil 23, and the mold temperature adjuster 24, in particular. It may be noted that the same or like parts and components are denoted as the same reference numerals.

Figure 10:
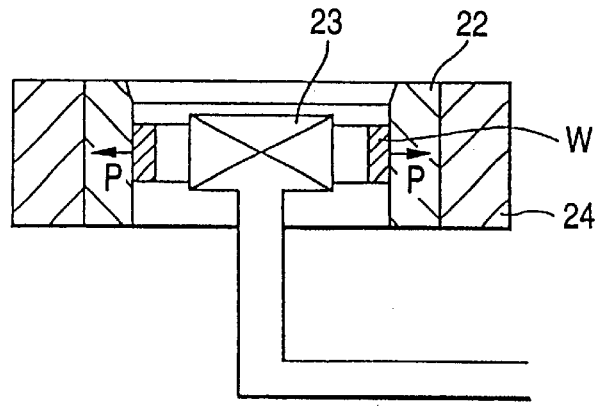
FIG. 10 is a sectional view showing a main portion in a second embodiment of the corrective tempering apparatus according to the invention.

FIG. 10 shows a second embodiment of the corrective tempering apparatus. The outer diameter of the workpiece W is corrected by induction heating based on an inner diameter heating method. The mold 22 is arranged outside the induction heating coil 23 in the radial direction of the coil. The mold temperature adjuster 24 is arranged so as to be in intimate contact with the outer diameter surface of the mold 22.

Figure 11:
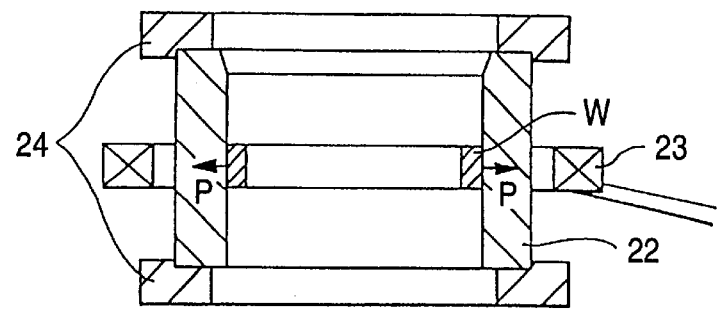
FIG. 11 is a sectional view showing a main portion in a third embodiment of the corrective tempering apparatus.

FIG. 11 shows a third embodiment of the corrective tempering apparatus. The outer diameter of the workpiece W is corrected by induction heating based on an outer diameter heating method. The induction heating coil 23 is arranged outside the mold 22 in the radial direction of the mold, the mold 22 having the workpiece W forced thereinto. The mold temperature adjusters 24 are arranged so as to be in intimate contact with the mold 22 and so as to be distant from the coil 23 in the axial direction of the coil so that the mold temperature adjusters 24 are less affected by high frequencies.

Figure 12:
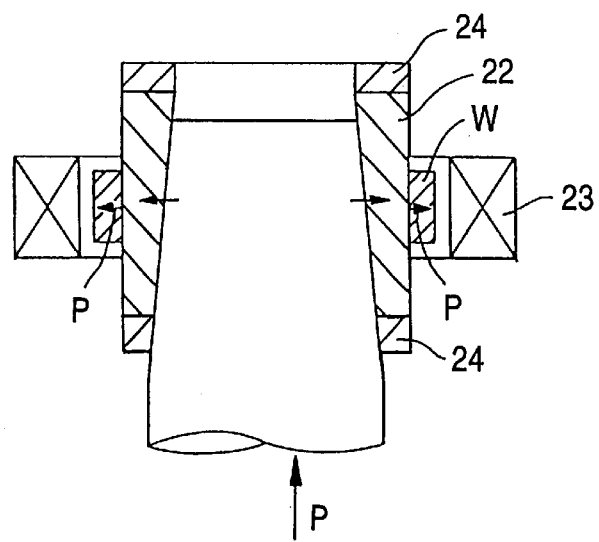
FIG. 12 is a sectional view showing a main portion in a fourth embodiment of the corrective tempering apparatus.

FIG. 12 shows a fourth embodiment of the corrective tempering apparatus. The inner diameter of the workpiece W is corrected. A collet type correcting mold 22 is employed. The inner diameter of the workpiece W is corrected by expansion while inserting the mold 22 into the inner diameter surface of the workpiece W and forcing a collet into the mold 22. The induction heating coil 23 is arranged outside the workpiece W. The mold temperature adjusters 24 are arranged outside the mold 22 in the axial direction of the coil.

FIGS. 13A and 13B show a fifth embodiment of the corrective tempering apparatus. The inner diameters of the workpieces W are corrected. FIG. 13A shows the molds 22 which is made of a material whose linear expansion coefficient is larger than those of the workpieces W. FIG. 13B shows the mold 22 which is heated by the induction heating coil 23 arranged outside the outer diameter surface of each workpiece W is thermally expanded to come in intimate contact with the inner diameter of the workpiece, so that the inner diameter of each workpiece is heated and pressured.

FIG. 14 shows a sixth embodiment of the corrective tempering apparatus. Both the inner and outer diameter surfaces of the workpiece W are corrected. This is an example in which the inner and outer diameter surfaces are corrected simultaneously using a collet mold 22A for the inner diameter surface and a cylindrical mold 22B for the outer diameter surface. The induction heating coils 23 are arranged on both upper and lower end faces of both molds. The mold temperature adjuster 24 is arranged outside the coils 23 in the radial direction of the coils 23.

FIGS. 15A and 15B each shows a seventh embodiment of the corrective tempering apparatus. The deformation of the workpiece W is corrected taperingly. This is an example in which not only the deformation is corrected by tapering, but also the outer and inner races of conical bearings are fabricated. The inner diameter surface of the mold 22 is tapered. A pressing tool 41 is employed, the tool 41 pressuring the workpiece W inserted into the mold 22 in the axial direction. The induction heating coils 23 are arranged on both upper and lower end faces of the tapered mold 22. The mold temperature adjuster 24 is arranged outside the coils 23 in the radial direction of the coils.

Figure 16:
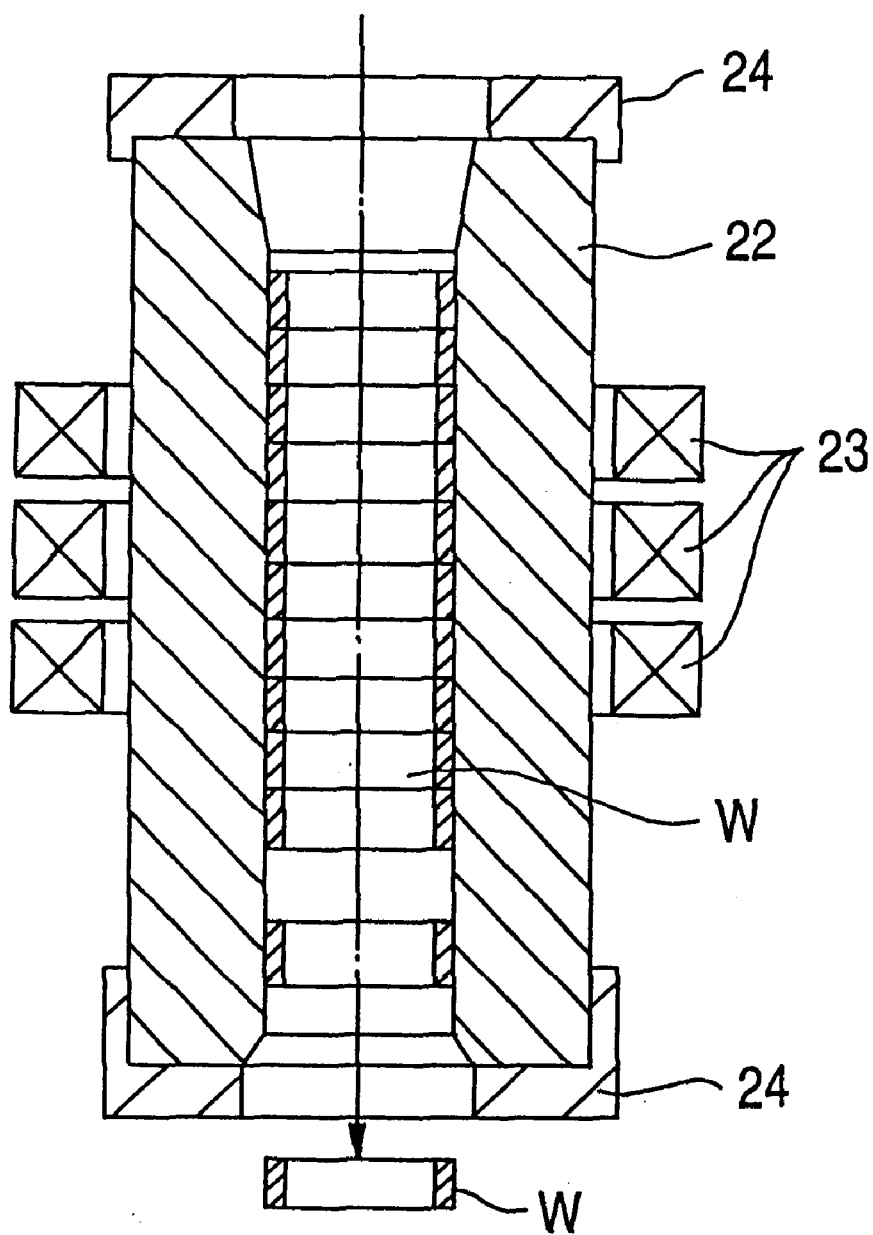
FIG. 16 is a sectional view showing a main portion in an eighth embodiment of the corrective tempering apparatus.

FIG. 16 shows an eighth embodiment of the corrective tempering apparatus. A plurality of workpieces W are processed at once using only one mold. The mold 22 is a vertically elongated cylindrical body. The workpieces W are inserted inside the mold 22 while placed one upon another in the axial direction of the mold. The outer diameter surfaces of the thus inserted workpieces are subjected to a continuous corrective tempering treatment. The outer diameter surfaces of the workpieces are bound by heating to be corrected by tempering and are thereafter separated from the mold by utilizing the shrinkage of the workpieces W brought about by cooling. The induction heating coils 23 are arranged in a plurality of rows so as to enclose the outer diameter surface of the cylindrical mold 22. The mold temperature adjusters 24 are arranged outside these coils 23 in the axial direction of the coils.

While the mold temperature adjusters are arranged so as to neighbor the correcting mold in the aforementioned apparatus and their modifications, the mold temperature adjusters may also be arranged inside the mold.

A comparative corrective tempering test carried out using the aforementioned corrective tempering apparatuses 20 will be described.

Thin-walled annular rolling elements made of steel were used as workpieces W. The steel grades selected were SUJ2, SCR420, SUS440C. These workpieces W were heated to 840° C. and kept at such temperature for 30 minutes. Then, the workpieces W were subjected to hardening using a hardening oil at 60° C. and were hardened to obtain specimens.

A total of five corrective tempering ceramic molds 22 were used. Their inner diameters were: 47.000 mm, 50.150 mm, 65.150 mm, 61.700 mm, and 62.200 mm.

A total of four mold temperatures were set by the mold temperature adjusters 24. The four mold temperatures were: 55° C., 200° C., 400° C., and 500° C.

A total of six maximum workpiece W temperatures were set by the induction heating coil 23. The six maximum workpiece W temperatures were: 200° C., 250° C., 300° C., 400° C., 500° C., and 600° C.

Table 1 shows evaluation items, evaluation criteria, and judgment symbols per evaluation item for the comparative test.

TABLE 1

| Evaluation | Degree of Correction (%) | Standardizing rate of dimensions (%) | Surface Roughness (Ra) | Rapid Treatment Time (sec) (including set time) | Tempering Consistency ($\Delta H_v$) (surface hardness dispersion) |
|---|---|---|---|---|---|
| A | 80≦ | 80≦ | <0.1 | 0–35 | 0–16 |
| B | 60–80 | 50–80 | 0.1–0.2 (inclusive) | 35–60 | 16–31 |
| C | — | 30–50 | — | 60–360 | — |
| D | <60 | <30 | not changed | 360≦ | 31≦ |

(Note) Evaluation is ranked with the following degrees:
A: very superior
B: superior
C: usable
D: not-usable.

The correcting degree of deformation (degree of correction) in the inner/outer diameter of a workpiece W was calculated in accordance with the following equation.

$$\text{Degree of correction} = \frac{\text{Pre-correction roundness} - \text{Post-correction roundness}}{\text{Pre-correction roundness}} \times 100$$

Further, the dimension standardizing rate was calculated in accordance with the following equation.

$$\text{Dimension standardizing rate} = \frac{\text{Pre-tempering dimensional dispersion} - \text{Post-tempering dimensional dispersion}}{\text{Pre-tempering dimensional dispersion}} \times 100$$

The object of the corrective tempering according to the invention is that the treated workpieces W satisfy the following conditions.

The correcting degree of deformation of the inner/outer diameter is 60% or more.

The rate of standardizing the dimension of the inner/outer diameter is 30% or more.

The surface roughness of the corrected surface is less than Ra 0.2 μm.

The rapid treatment time is within 360 seconds (6 minutes).

The surface hardness is HRC 56 or more.

Tables 2A to 2D show the test conditions and the test results.

The column for the degree of working (%) in Table 2A shows a degree of working δ, which is calculated in accordance with the following equation.

$$\delta = \{D/d\, (1+\alpha \cdot T) - 1\} \times 100 \qquad (1)$$

where D: Outer diameter of a workpiece before corrective tempering (mm)

d: Inner diameter of a correcting mold (mm)

α: Linear expansion coefficient of a steel grade (e.g., 0.000012 for SUJ2)

T: Maximum workpiece temperature (°C.)

TABLE 2A

|  | Steel Species | No. | Dimensions | | | Degree of Working | | S | V | S/V |
|---|---|---|---|---|---|---|---|---|---|---|
|  |  |  | Inner | Outer | Height | 250° C. | 500° C. |  |  |  |
| Inventive Examples | SUJ2 | A1 | 43.78 | 46.81 | 7.00 | — | 0.20 | 1029 | 1509 | 0.68 |
|  |  | A2 | 43.78 | 46.95 | 7.00 | 0.20 | 0.50 | 1032 | 1581 | 0.65 |
|  |  | A3 | 43.78 | 47.00 | 7.00 | 0.30 | 0.60 | 1033 | 1606 | 0.64 |
|  |  | A4 | 43.78 | 47.15 | 7.00 | 0.62 | 0.92 | 1036 | 1684 | 0.62 |
|  |  | A5 | 43.78 | 47.17 | 7.00 | 0.66 | 0.96 | 1037 | 1694 | 0.61 |
|  |  | A6 | 43.78 | 47.20 | 7.00 | 0.73 | 1.03 | 1037 | 1710 | 0.61 |
|  | SUJ2 | B1 | 43.78 | 47.15 | 7.00 | 0.62 | 0.93 | 1036 | 1685 | 0.62 |
|  |  | B2 | 43.78 | 47.20 | 7.00 | 0.73 | 1.03 | 1037 | 1710 | 0.61 |
|  | SCR420 | C1 | 43.78 | 47.15 | 7.00 | 0.62 | 0.92 | 1036 | 1684 | 0.62 |
|  |  | C2 | 43.78 | 47.20 | 7.00 | 0.73 | 1.03 | 1037 | 1710 | 0.61 |
|  | SUS440C | D1 | 43.78 | 47.15 | 7.00 | 0.62 | 0.92 | 1036 | 1684 | 0.62 |
|  |  | D2 | 43.78 | 47.20 | 7.00 | 0.73 | 1.03 | 1037 | 1710 | 0.61 |
|  | SUJ2 | E1 | 43.78 | 47.15 | 7.00 | 0.62 | 0.92 | 1036 | 1684 | 0.62 |
|  |  | E2 | 43.78 | 47.15 | 7.00 | 0.62 | 0.92 | 1036 | 1684 | 0.62 |
|  |  | E3 | 43.78 | 47.15 | 7.00 | 0.62 | 0.92 | 1036 | 1684 | 0.62 |
|  |  | E4 | 43.78 | 47.15 | 7.00 | 0.62 | 0.92 | 1036 | 1684 | 0.62 |
|  | SUJ2 | F1 | 42.00 | 50.26 | 6.40 | 0.62 | 0.92 | 1010 | 3829 | 0.26 |
|  |  | F2 | 42.00 | 50.26 | 6.40 | 0.62 | 0.92 | 1010 | 3829 | 0.26 |
|  |  | F3 | 42.00 | 50.26 | 6.40 | 0.62 | 0.92 | 1010 | 3829 | 0.26 |
|  |  | F4 | 42.00 | 50.26 | 6.40 | 0.62 | 0.92 | 1010 | 3829 | 0.26 |
|  | SUJ2 | G1 | 55.00 | 65.35 | 8.00 | 0.61 | 0.91 | 1642 | 7823 | 0.21 |
|  |  | G2 | 55.00 | 65.35 | 8.00 | 0.61 | 0.91 | 1642 | 7823 | 0.21 |
|  |  | G3 | 55.00 | 65.35 | 8.00 | 0.61 | 0.91 | 1642 | 7823 | 0.21 |
|  |  | G4 | 55.00 | 65.35 | 8.00 | 0.61 | 0.91 | 1642 | 7823 | 0.21 |
|  | SUJ2 | H1 | 50.00 | 61.90 | 9.00 | 0.63 | 0.93 | 1749 | 9408 | 0.19 |
|  |  | H2 | 50.00 | 61.90 | 9.00 | 0.63 | 0.93 | 1749 | 9408 | 0.19 |
|  |  | H3 | 50.00 | 61.90 | 9.00 | 0.63 | 0.93 | 1749 | 9408 | 0.19 |
|  | SUJ2 | I1 | 41.50 | 62.40 | 7.50 | 0.62 | 0.92 | 1470 | 12785 | 0.11 |
|  |  | I2 | 41.50 | 62.40 | 7.50 | 0.62 | 0.92 | 1470 | 12785 | 0.11 |
| Comparative Examples | SUJ2 | J1 | 43.78 | 46.70 | 7.00 | −1.34 | −0.04 | 1026 | 1452 | 0.71 |
|  |  | J2 | 43.78 | 46.72 | 7.00 | −0.30 | 0.00 | 1027 | 1462 | 0.70 |
|  |  | J3 | 43.78 | 47.23 | 7.00 | 0.79 | 1.09 | 1038 | 1725 | 0.60 |
|  | SUJ2 | K1 | 50.00 | 61.90 | 9.00 | 0.63 | 0.93 | 1749 | 9408 | 0.19 |
|  | SUJ2 | L1 | 41.50 | 62.40 | 7.50 | 0.62 | 0.92 | 1470 | 12785 | 0.11 |
|  |  | L2 | 41.50 | 62.40 | 7.50 | 0.62 | 0.92 | 1470 | 12785 | 0.11 |
|  | SUJ2 | M1 | 43.78 | 47.15 | 7.00 | 0.62 | 0.92 | 1036 | 1684 | 0.62 |
|  |  | M2 | 43.78 | 47.20 | 7.00 | 0.73 | 1.03 | 1037 | 1710 | 0.61 |
|  | SUJ2 | N1 | 43.78 | 47.15 | 7.00 | 0.62 | 0.92 | 1036 | 1684 | 0.62 |
|  |  | N2 | 43.78 | 47.20 | 7.00 | 0.73 | 1.03 | 1037 | 1710 | 0.61 |
|  | SUJ2 | O1 | 43.78 | 47.15 | 7.00 | 0.62 | 0.92 | 1036 | 1684 | 0.62 |
|  |  | O2 | 43.78 | 47.20 | 7.00 | 0.73 | 1.03 | 1037 | 1710 | 0.61 |

TABLE 2B

| | Steel Species | No. | Pre-treatment | Mold Dimensions (Correcting Part) | Mold Temp. | Corrective Tempering Heating Temp. | | Heating Time |
|---|---|---|---|---|---|---|---|---|
| Inventive Examples | SUJ2 | A1 | Lathe | 47.000 | 55° C. | 500° C. | | 3 sec. |
| | | A2 | | | | 250° C. | | 3 sec. |
| | | A3 | | | | 300° C. | × | 10 sec. |
| | | A4 | | | | 400° C. | | 30 sec. |
| | | A5 | | | | 500° C. | | |
| | | A6 | | | | | | |
| | SUJ2 | B1 | CRF | 47.000 | 55° C. | 400° C. | × | 3 sec. |
| | | B2 | | | | 500° C. | | 10 sec. |
| | SCR420 | C1 | Lathe | 47.000 | 55° C. | 400° C. | × | 3 sec. |
| | | C2 | | | | 500° C. | × | 10 sec. |
| | SUS440C | D1 | Lathe | 47.000 | 55° C. | 400° C. | × | 3 sec. |
| | | D2 | | | | 500° C. | × | 10 sec. |
| | SUJ2 | E1 | Lathe | 47.000 | 55° C. | Induction Heating | | 3 sec. |
| | | E2 | | | 200° C. | 400° C. | | 3 sec. |
| | | E3 | | | 400° C. | | | 2 sec. |
| | | E4 | | | 500° C. | Only Conduction Heating 400° C. | | 20° C. |
| | SUJ2 | F1 | Lathe | 50.150 | 55° C. | Induction Heating | | 10 sec. |
| | | F2 | | | 200° C. | 400° C. | | 7 sec. |
| | | F3 | | | 400° C. | | | 6 sec. |
| | | F4 | | | 500° C. | Only Conduction Heating 400° C. | | 30 sec. |
| | SUJ2 | G1 | Lathe | 65.150 | 55° C. | Induction Heating | | 25 sec. |
| | | G2 | | | 200° C. | 400° C. | | 15 sec. |
| | | G3 | | | 400° C. | | | 10 sec. |
| | | G4 | | | 500° C. | Only Conduction Heating 400° C. | | 40 sec. |
| | SUJ2 | H1 | Lathe | 61.700 | 200° C. | Induction Heating | | 25 sec. |
| | | H2 | | | 400° C. | 400° C. | | 20 sec. |
| | | H3 | | | 500° C. | Only Conduction Heating 400° C. | | 60 sec. |
| | SUJ2 | I1 | Lathe | 62.200 | 400° C. | Induction Heating 400° C. | | 27 sec. |
| | | I2 | | | 500° C. | Only Conduction Heating 400° C. | | 80 sec. |
| Comparative Examples | SUJ2 | J1 | Lathe | 47.000 | 55° C. | 250° C. | × | 3 sec. |
| | | J2 | | | | 500° C. | | 7 sec. |
| | | J3 | | | | Impossible for Forcing | | |
| | SUJ2 | K1 | Lathe | 61.700 | 55° C. | Induction Heating 400° C. | | 30 sec. |
| | SUJ2 | L1 | Lathe | 62.200 | 55° C. | Induction Heating 400° C. | | 30 sec. |
| | | L2 | | | 200° C. | Induction Heating 400° C. | | 30 sec. |
| | SUJ2 | M1 | Lathe | 47.000 | 55° C. | 200° C. | × | 3 sec. |
| | | M2 | | | | | | 30 sec. |
| | SUJ2 | N1 | Lathe | 47.000 | 55° C. | 600° C. | × | 3 sec. |
| | | N2 | | | | | | 30 sec. |
| | SUJ2 | O1 | Lathe | | | Bracing Tempering | | |
| | | O2 | | | | 200° C. | | 2 Hr |

TABLE 2C

| | Steel Species | No. | Outer Diameter Correction | Dispersion | | Roughness (Ra) | Inner Diameter Correction | Dispersion | |
|---|---|---|---|---|---|---|---|---|---|
| Inventive Examples | SUJ2 | A1 | B | A | | B | B | C | |
| | | A2 | 250° C. Heated Element | B | C | B | 250° C. Heated Element | C | B |
| | | A3 | 300° C. Heated Element | B | B | B | 300° C. Heated Element | B | B |
| | | A4 | 400° C. Heated Element | A | A | A | 400° C. Heated Element | B | C |
| | | A5 | 500° C. Heated Element | A | A | A | 500° C. Heated Element | B | C |
| | | A6 | | | | A | | | |
| | SUJ2 | B1 | All A | | | | All A | | |
| | | B2 | | | | | | | |
| | SCR420 | C1 | 400° C. Heated Element | A | A | A | 400° C. Heated Element | B | C |
| | | C2 | 500° C. Heated Element | A | A | A | 500° C. Heated Element | B | C |
| | SUS440C | D1 | 400° C. Heated Element | A | A | A | 400° C. Heated Element | B | C |
| | | D2 | 500° C. Heated Element | A | A | A | 500° C. Heated Element | B | C |
| | SUJ2 | E1 | A | Impossible due to same | | A | B | Impossible due to same | |
| | | E2 | | | | | | | |

TABLE 2C-continued

| | Steel Species | No. | Outer Diameter Correction | Outer Diameter Dispersion | Roughness (Ra) | Inner Diameter Correction | Inner Diameter Dispersion |
|---|---|---|---|---|---|---|---|
| | | E3 | | dimensions | | | dimensions |
| | | E4 | | | | | |
| | SUJ2 | F1 | A | Impossible | A | B | Impossible |
| | | F2 | | due to same | | | due to same |
| | | F3 | | dimensions | | | dimensions |
| | | F4 | | | | | |
| | SUJ2 | G1 | A | Impossible | A | B | Impossible |
| | | G2 | | due to same | | | due to same |
| | | G3 | | dimensions | | | dimensions |
| | | G4 | | | | B | |
| | SUJ2 | H1 | A | Impossible | A | B | Impossible |
| | | H2 | | due to same | | | due to same |
| | | H3 | | dimensions | | | dimensions |
| | SUJ2 | I1 | A | Impossible | A | B | Impossible |
| | | I2 | | due to same | | | due to same |
| | | | | dimensions | | | dimensions |
| Comparative Examples | SUJ2 | J1 | 250° C. Heated Element | D  D | — | 250° C. Heated Element | D  D |
| | | J2 | 500° C. Heated Element | D  D | — | 500° C. Heated Element | D  D |
| | | J3 | All D due to being impossible for forcing | | | | |
| | SUJ2 | K1 | A | Impossible | A | B | Impossible |
| | SUJ2 | L1 | A | Impossible | A | B | Impossible |
| | | L2 | | due to same | | | due to same |
| | | | | dimensions | | | dimensions |
| | SUJ2 | M1 | D | D | A | D | B |
| | | M2 | D | D | A | D | B |
| | SUJ2 | N1 | A | A | A | B | D |
| | | N2 | | | A | | |
| | SUJ2 | O1 | B | D | — | D | D |
| | | O2 | | | — | | |

TABLE 2D

| | Steel Species | No. | Hardness (HRC) | Tempering Consistency | Rapid Treatment Time |
|---|---|---|---|---|---|
| Inventive Examples | SUJ2 | A1 | HRC | A | A |
| | | A2 | 56–66 | | |
| | | A3 | | | |
| | | A4 | | | |
| | | A5 | | | |
| | | A6 | | | |
| | SUJ2 | B1 | | A | A |
| | | B2 | | | |
| | SCR420 | C1 | | A | A |
| | | C2 | | | |
| | SUS440C | D1 | | A | A |
| | | D2 | | | |
| | SUJ2 | E1 | | A | A |
| | | E2 | | | |
| | | E3 | | | |
| | | E4 | | | |
| | SUJ2 | F1 | | B | A |
| | | F2 | | A | |
| | | F3 | | | |
| | | F4 | | | B |
| | SUJ2 | G1 | | B | A |
| | | G2 | | | |
| | | G3 | | A | |
| | | G4 | | | B |
| | SUJ2 | H1 | | B | A |
| | | H2 | | | |
| | | H3 | | A | C |
| | SUJ2 | I1 | | B | C |
| | | I2 | | A | C |
| Comparative Examples | SUJ2 | J1 | HRC | A | — |
| | | J2 | 56–66 | | |
| | | J3 | All D due to being impossible for forcing | | |
| | SUJ2 | K1 | HRC | D | A |
| | | L1 | 56–66 | D | A |
| | | L2 | | D | B |
| | SUJ2 | M1 | | A | A |
| | | M2 | | | |
| | SUJ2 | N1 | HRC | A | A |
| | | N2 | 48–52 | | |
| | SUJ2 | O1 | HRC | A | D |
| | | O2 | 56–66 | | |

Incidentally, the degree of working for a workpiece to be corrected by the mold in these tests was calculated in accordance with the following equation.

$$\text{Degree of working (\%)} = \frac{\text{Outer diameter of workpiece} - \text{Inner diameter of mold}}{\text{Inner diameter of mold}} \times 100$$

The lower limit of the degree of working is the minimum degree of working that permits the correction of the deformation of a workpiece. If the degree of working is calculated based on the inner diameter of a mold and is found to be less than the lower limit, then the workpiece cannot be corrected by such a mold. On the other hand, the upper limit of the degree of working is the maximum degree of working that permits the forcing of a workpiece into a mold. If the degree of working is calculated based on the inner diameter of a mold and is found to be more than the upper limit, the workpiece cannot be forced into such a mold because the outer diameter of the workpiece (at room temperature) is too large for the inner diameter of the mold.

The upper limit of the degree of working δ is determined in the following way.

Let it be assumed that the inner diameter d of a correcting mold is set constant and that the maximum outer diameter of a workpiece permitting the workpiece to be forced into the correcting mold before corrective tempering is $D_0$. Since equation (1) expressing the degree of working δ can be converted into $$\delta=\{(D-d)/d+D\alpha T/d\}\times 100 = K_1+K_2T \quad (2)$$

(where $K_1=100\times(D-d)/d$, $K_2=100D\alpha/d$)

Therefore, a curve defined by $K_1=K_{10}$, $K_2=K_{20}$ that are obtained by substituting $D=D_0$ into $K_1$, $K_2$ in equation (2) expresses $\delta_{max}$ (%) permitting the forcing of the workpiece into the mold. That is, the upper limit of the degree of working is defined by $$\delta_{max}=K_{10}+K_{20}T \quad (3)$$

The outer diameter of specimen A6 was the limit that permits a specimen to be forced into the mold in this invention. The upper limit δ of the degree of working, i.e., $\delta_{max}$ (%) of equation (3) at maximum workpiece temperatures of 250° C. and 500° C. can be calculated as follows from Table 2A.

Since the linear expansion coefficient α of the steel grade SUJ2 is 0.000012, $$\delta_{max}=\{47.20/47.000(1+0.000012\times 250)-1\}\times 100\ 0.73\%$$

at 250° C.

$$\delta_{max}=\{47.20/47.000(1+0.000012\times 500)-1\}\times 100=1.03\%$$

at 500° C.

Further, $K_{10}$, $K_{20}$ are $K_{10}=100\times(47.20-47.0)/47.0 \approx 0.43$ $K_{20}=100\times 47.2\times\alpha/47.0 \approx 100.4\alpha$ It may be noted that $K_{20}=1.21\times 10^{-3}$ when α=0.000012 is substituted.

$K_{10}$, $K_{20}$ were obtained on a test basis assuming that d=47.00 and the like. Even taking into account the fact that the roundnesses of hardened workpieces are not consistent and the fact that the dimensions of workpieces and correcting molds are changed, $K_{10}$, $K_{20}$ can be defined as follows.

$K_{10}=0.43\pm 0.03$ $K_{20}=(100.4\pm 0.2)\alpha$

While differences between room temperatures and 0° C. and fluctuations brought about by the temperature in the inner diameter d of a correcting mold have been neglected in the aforementioned equations (1) to (3) and the like, all these values are very small in view of the elastic deformability of a workpiece and the like. Accordingly, it can be said that substantially reliable approximations can be provided by the aforementioned equations and the like.

It was verified that all the combinations of the outer diameters of the workpieces and the inner diameters of the molds of the invention were within the range between the upper limit δ (=$\delta_{max}$) and the lower limit δ (=0.20) and that some of Comparative Examples were out of that range (specimen J3 exceeding the upper limit δ, so that specimen J3 cannot be forced into the mold, and specimens J1 and J2 were smaller than the lower limit δ so that specimens J1 and J2 cannot be corrected).

Figure 17:
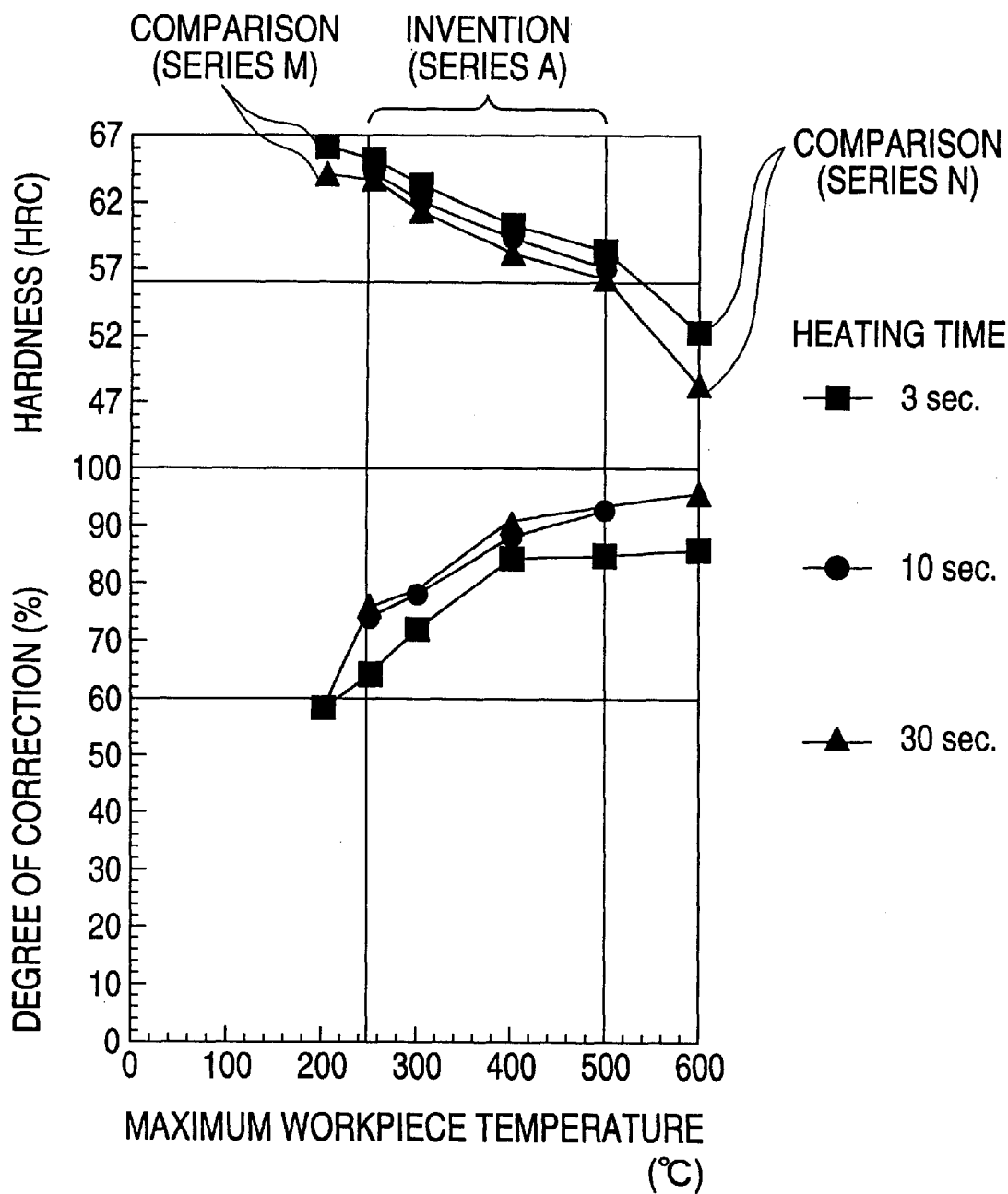
FIG. 17 is a diagram showing a relationship among maximum workpiece temperatures, correcting degrees of deformation, and workpiece surface hardnesses obtained by a corrective tempering test.

FIG. 17 is a graph showing the results of the corrective tempering test made to compare Inventive Examples A1 to A6 with Comparative Examples M1, M2 and N1, N2. The abscissa indicates the maximum workpiece temperature, whereas the ordinate indicates the correcting degree of deformation and the workpiece surface hardness (HRC).

The correcting degree of deformation differs from every heating time and is improved as increasing maximum workpiece temperature. When the maximum workpiece temperature exceeds 500° C., the correcting degree of deformation is no longer improved. The passable lower limit is 60% in the graph. A more preferable passable lower limit is 80%.

It is understood from these results that a maximum workpiece temperature range satisfying both a passable surface hardness limit of HRC 56 within 30 seconds of the heating time and a passable degree of correction of 60% or more is between 250° C. and 500° C.

Figure 18:
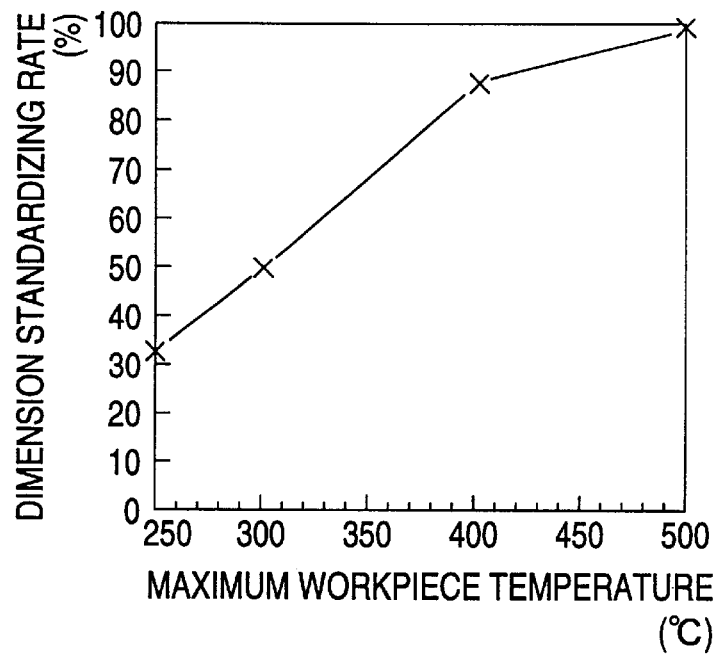
FIG. 18 is a diagram showing a relationship between maximum workpiece temperatures and dimension standardizing rates obtained by the corrective tempering test.

FIG. 18 is a plot illustrating a relationship between the maximum workpiece temperature and the dimension (outer diameter) standardizing rate from the test results of Inventive Examples A1 to A6 in Tables 2A to 2C. The dimension standardizing rate increases as the dimensional dispersion after tempering decreases, compared with the dimensional dispersion before tempering. Therefore, the effect of correcting for making the dimensions consistent are significant. It is understood from this graph that the effect of correcting are satisfactory within a maximum workpiece temperature range of from 250 to 500° C. and that the effect of correcting are more satisfactory within a range of from 300 to 500° C., or still more satisfactory within a range of from 380 to 500° C.

Figure 19:
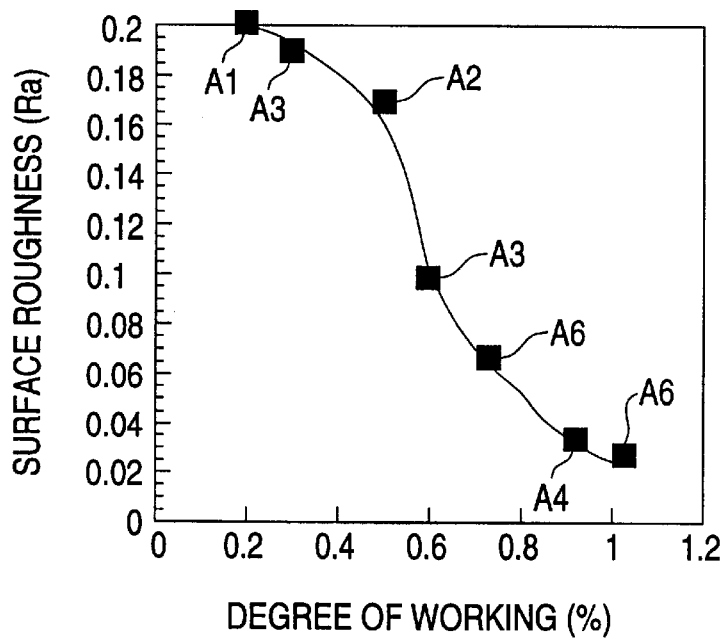
FIG. 19 is a diagram showing a relationship between degrees of working and surface roughnesses Ra ($\mu$m) of surfaces (the outer diameter surface in this case) obtained by the corrective tempering test, the surface being corrected by a correcting mold.

FIG. 19 is a plot illustrating a relationship between the degree of working and the surface roughness Ra (μm) of the deformed surfaces (the outer diameter surfaces in this case) corrected by the correcting mold from the test results of Inventive Examples A1 to A6 in Tables 2A and 2C.

If the worst surface roughness permitting correction is set to Ra 0.2 μm, the degree of working may be 0.2% or more. Inventive Examples A1 to A6 all satisfy this degree of working. Further, it is understood from FIG. 19 that the degree of working must, more preferably, be 0.6% or more (Ra 0.1 μm or less).

Figure 20:
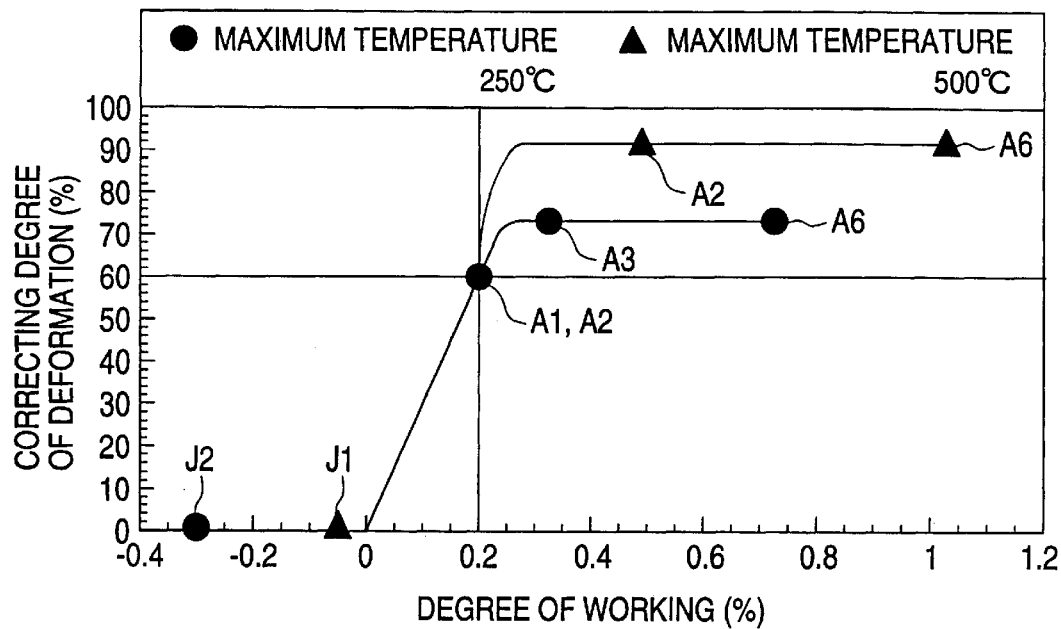
FIG. 20 is a diagram showing a relationship between degrees of working and correcting degrees of deformation obtained by the corrective tempering test.

FIG. 20 is a plot illustrating a relationship between the degree of working (in abscissa) and the correcting degree of deformation from the test results of Inventive Examples A1 to A6 and Comparative Examples J1 and J2 in Tables 2A and 2B.

It is apparent also from these results that a correcting degree of deformation of 60% or more is obtained only when the degree of working is 0.2% or more. In other words, it is apparent that the lower limit of the degree of working is 0.2%.

Figure 21:
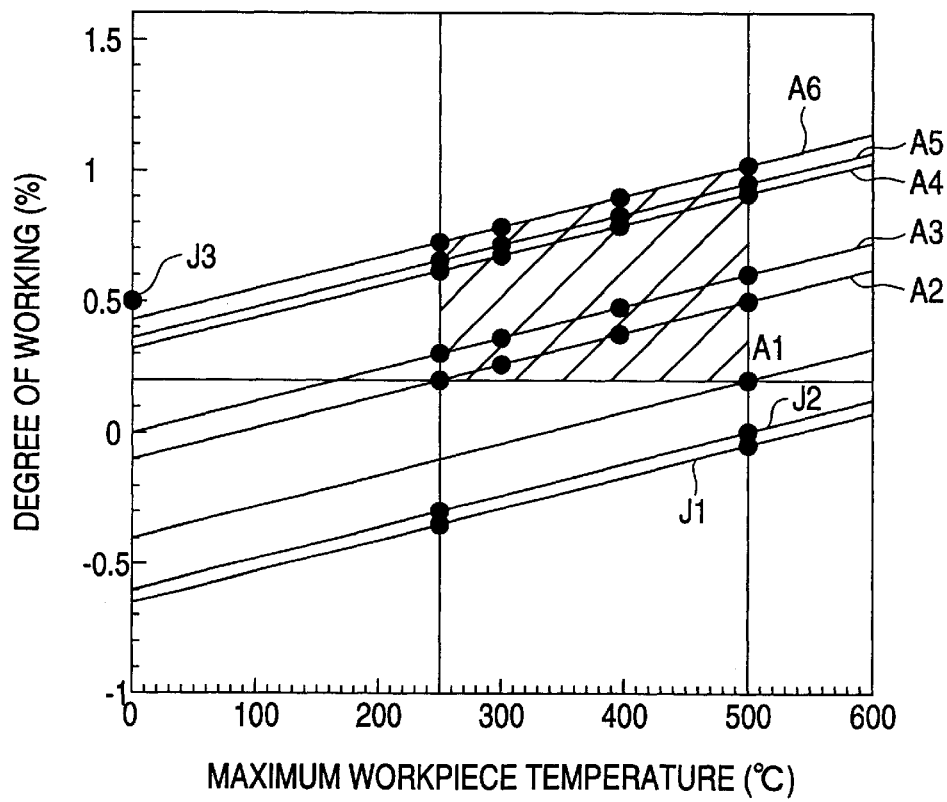
FIG. 21 is a diagram showing an appropriate range (shaded portion) of corrective tempering conditions of the invention obtained from the relationship between maximum workpiece temperatures and degrees of working, the appropriate range being obtained by the corrective tempering test.

FIG. 21 is a plot illustrating a relationship between the maximum workpiece temperature (in abscissa) and the degree of working from the test results of Inventive Examples A1 to A6 and Comparative Examples J1 to J3 in Tables 2A and 2C. In FIG. 21, the horizontal line indicating a degree of working of 0.2% is the lower limit of the degree of working, i.e., the minimum degree of working that permits correction of a workpiece. Further, while the lines of the degrees of working plotted by each of Inventive Examples A1 to A6 and Comparative Examples J1 to J3 are presented in the graph, it was found out that the upper limit of the degree of working, i.e., the maximum degree of working permitting a workpiece W to be forced into a mold is defined by the line of the degree of working of Inventive Example A6 in this embodiment as described above. That is, the maximum degree of working is determined by the curve obtained within the range of $K_{10}=0.43\pm 0.03$, and $K_{20}=(100.4\pm 0.2)\alpha$ in equation (3).

That is, it is possible to increase the upper limit of the degree of working δ up to the value so defined as described above from the lower limit of the degree of working, 0.20%, within the maximum workpiece temperature range of from 250 to 500° C. The shaded area in the middle of FIG. 21 is the maximum workpiece temperature and the degree of working range permitting the workpiece W to be forced into the mold while satisfying all such effects of the invention as a surface hardness of HRC 56 or more, a correcting degree of deformation of 60% or more, a dimension standardizing rate of 30% or more, and a corrected surface roughness of less than Ra 0.2 μm.

Figure 22:
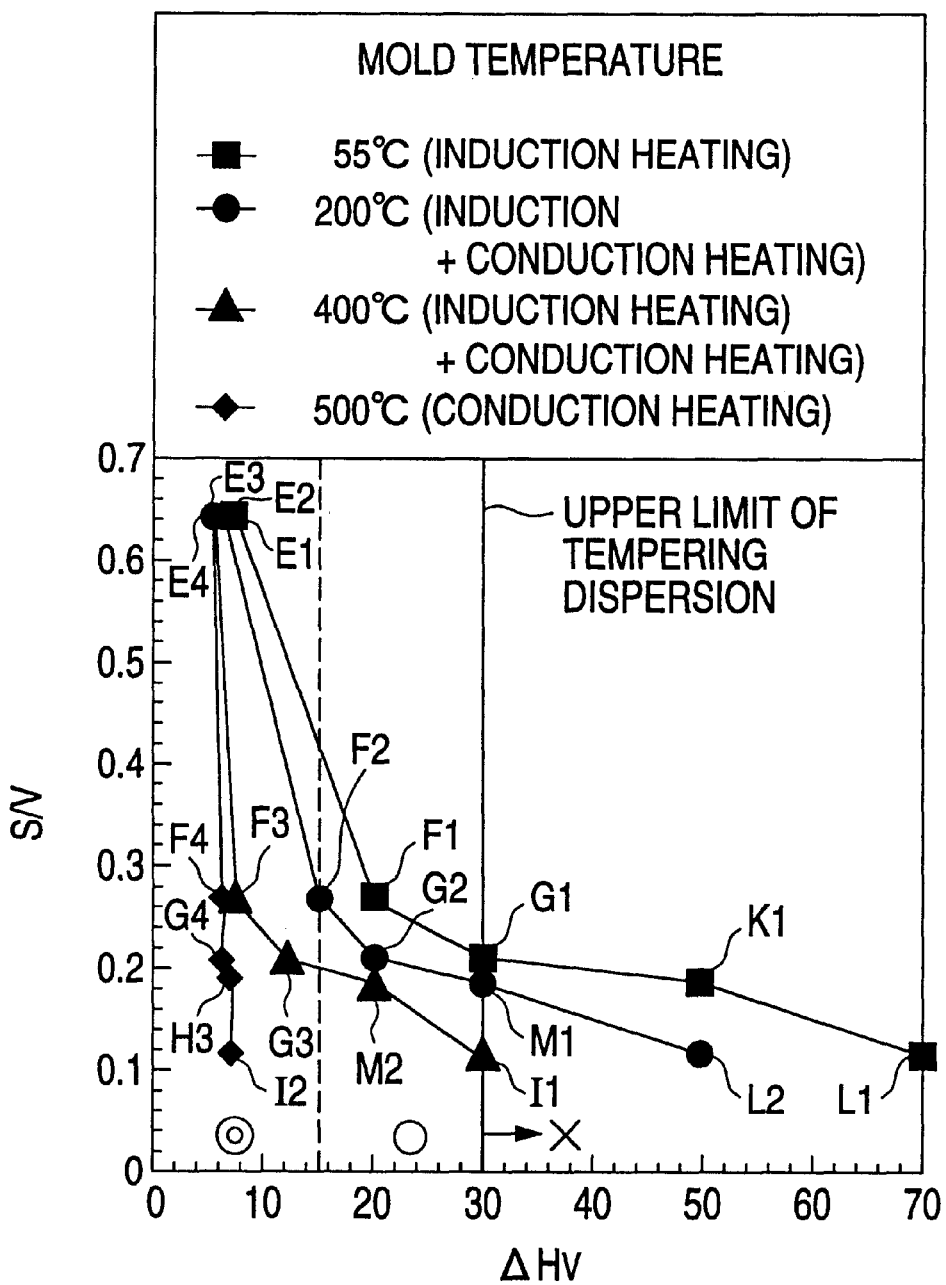
FIG. 22 is a diagram showing effects of the shape of a workpiece exerted on the corrective tempering conditions, the effects being obtained by a corrective tempering test.

FIG. 22 shows how the shape of a workpiece W affects corrective tempering.

Differences $\Delta H_v$ (surface hardness dispersion) between the largest value and the smallest value in the surface hardness ($H_v$) of the workpiece W and ratios of the contact surface area between the mold 22 and the workpiece W to the volume V (S/V ratio) of the workpiece W were plotted with the abscissa indicating the difference $\Delta H_v$ and with the ordinate indicating the S/V ratio with respect to a plurality of specimens including Inventive and Comparative Examples denoted as respective reference symbols in Table 2A. The mold temperature was set to different values from 55 to 500° C. using the mold temperature adjuster 24. The workpieces W, which were the specimens, were heated through conduction heating from the mold 22 and through induction heating using the induction heating coil 23 either singly or in combination. It may be noted that the workpiece temperature was 400° C. and that the average surface hardness ranged from HRC 58 to 60. The upper limit surface hardness dispersion $\Delta H_v$ is 30 or less, or more preferably 16 or less. Further, a S/V ratio of 0.27 or more is required when induction heating is employed, and a S/V ratio of 0.1 or more is required when only conduction heating is employed.

As increasing the S/V ratio, the surface hardness dispersion $\Delta H_v$ decreases in a heating method based mainly on induction heating and the treatment time is shortened. In this case, the mold temperature is low, so that the workpiece W can be set in the mold easily without thermal expansion. In addition, the workpiece W is cooled rapidly and is therefore naturally dropped after the treatment. This dispenses with the use of the extracting mold, which in turn contributes to increasing the life of the mold.

On the other hand, as decreasing the S/V ratio, the chances for employing a heating method based mainly on conduction increase, which provides the advantage of allowing large workpieces to be treated with less surface hardness dispersion. However, this heating method entails a long treatment time and makes the setting of a workpiece in and taking the workpiece out of a mold hard, which in turn makes it likely to reduce the life of the mold.

Another deformation correcting test will be described.

Separately from the aforementioned test, a test was carried out by subjecting workpieces W, which are the outer races of ball bearings, to a deformation correcting treatment in order to study a relationship between correcting energy and mold temperature. This another deformation correcting test will now be described.

Figure 23A:
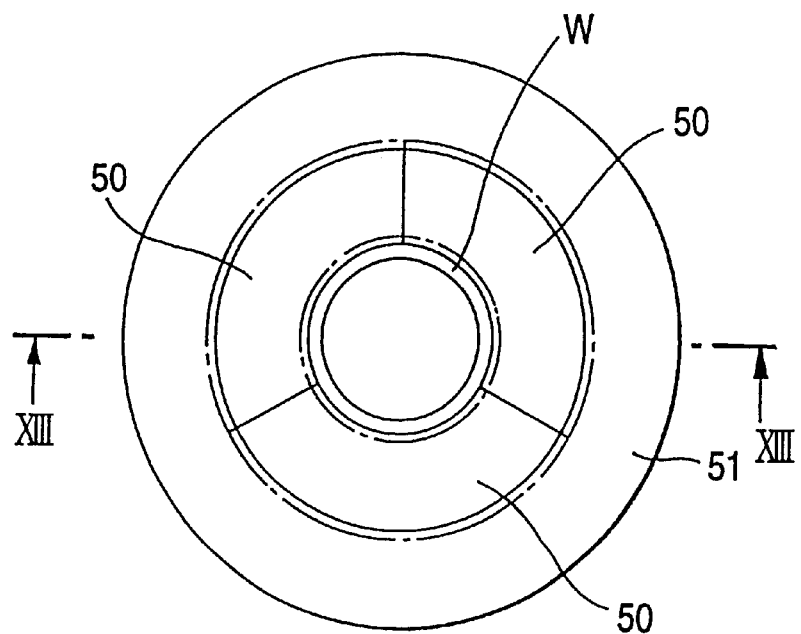
FIG. 23A is a plan view of a correcting mold used in another deformation correcting test with outer races of ball bearings used as workpieces.
Figure 23B:
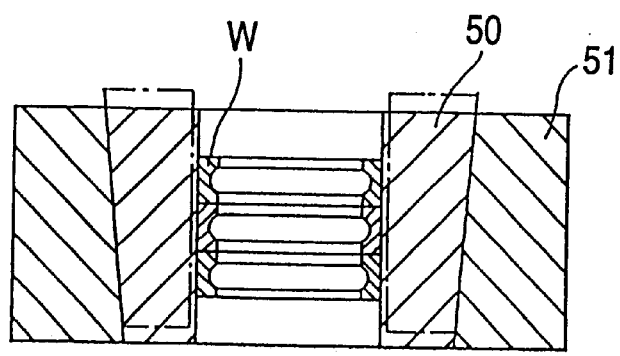
FIG. 23B is a sectional view taken along an arrow XXIII—XXIII shown in FIG. 23A.

FIGS. 23A and 23B are a diagram showing a mold of a corrective tempering apparatus used for the test.

The workpieces W used in the test were the outer races of ball bearings, whose designations are 6808, 6808, 6212, and 6312 made of SUJ2. A total of four S/V ratios, i.e., the ratio of the volume (V mm³) to the contact surface area (S mm²) were arranged. These four values are: 1, 0, 0.5, 0.25, and 0.17 for the above designations, respectively.

These outer races (workpieces W) were kept at 840° C. for 20 minutes, thereafter dipped into an oil bath for hardening, and then inserted into a split mold 50 (trisected) that had been heated to a predetermined temperature. The workpieces W were heated and pressured for a predetermined time by inserting the split mold 50 into an outer mold 51, and then taken out of the mold 50. Then, the roundnesses and hardnesses of these workpieces W were measured, and a comparison was then made with the roundnesses of these workpieces W after hardening and before the pressuring and heating of the corrective tempering.

Figure 24:
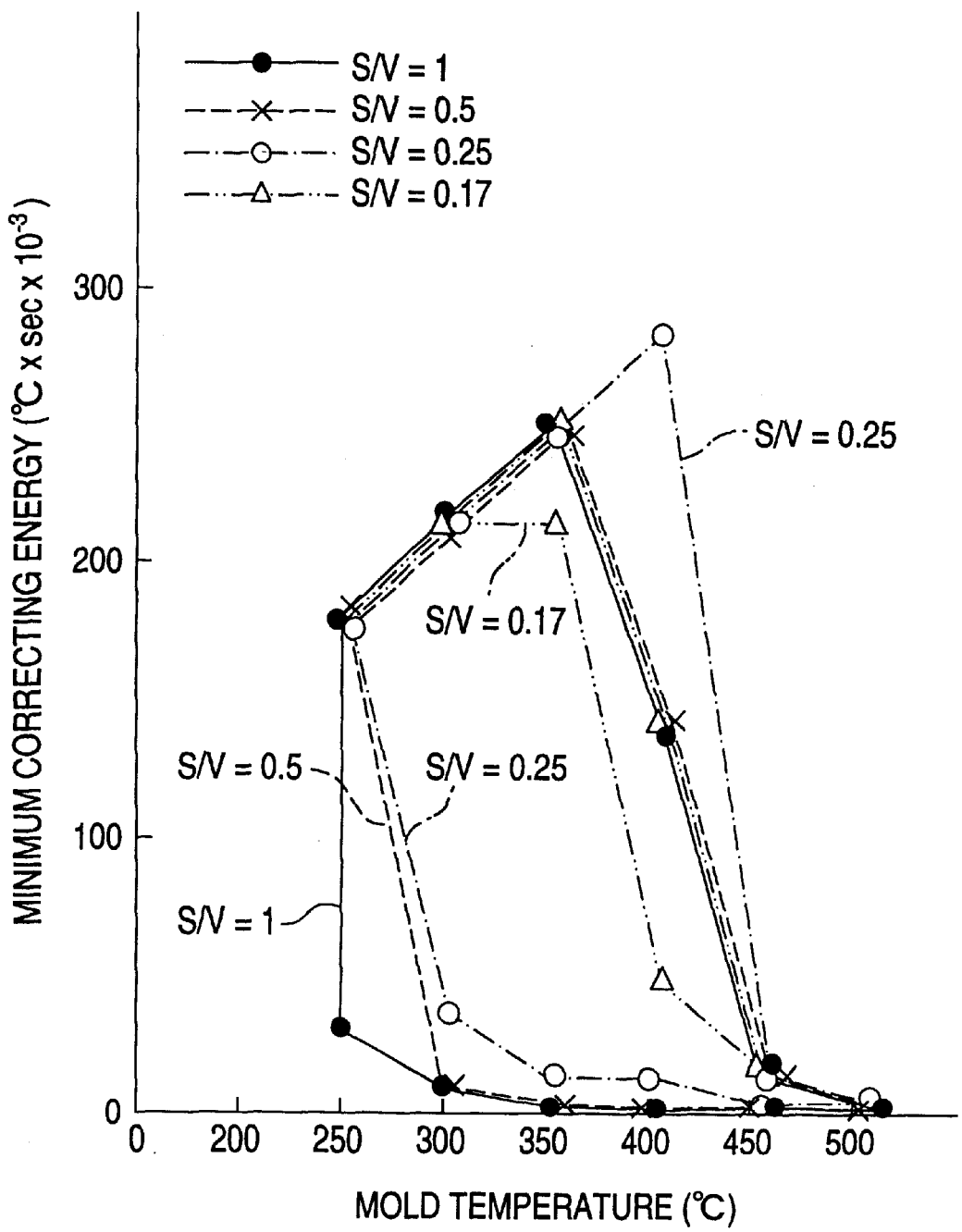
FIG. 24 is a diagram showing a relationship between correcting energy and product temperature with a S/V ratio as a parameter, the relationship being obtained by the deformation correcting test carried out using the mold shown in FIGS. 23A and 23B.

FIG. 24 shows the results of these measurements.

The abscissa indicates the mold temperature measured by the mold temperature adjuster. The ordinate indicates the correcting energy. The correcting energy is calculated by the equation: Mold temperature (°C.)×Pressuring/heating time (sec)×10$_{-3}$. FIG. 24 shows that the workpiece W heating energy decreases as increasing S/V ratio, and also shows a S/V ratio of each workpiece W which can satisfy both a correcting degree of deformation of 60% or more and a surface hardness of HRC 56 or more. That is, the S/V ratio which allows satisfactory correcting results to be obtained is from 0.17 to 1.0.

As described in the foregoing, the corrective tempering methods for rolling elements according to the invention are characterized in that the hardening deformation of a rolling element made of steel is corrected by utilizing plasticity exhibited during the process of tempering the hard steel structure of the rolling element brought about by hardening. That is, the deformation correction is made by the method of heating (tempering) the steel rolling element having been subjected to hardening to 250 to 500° C. for a time not exceeding 6 minutes while applying pressure to the rolling element. As a result, the deformation of the rolling element can be corrected within a short period of time. In addition, not only the smallest hardness required for maintaining the rolling fatigue life of the rolling element, which is HRC 56, can be ensured, but also the amount of warpage or deformation of the outer diameter or inner diameter of the rolling element required to ensure product accuracies can be kept within a prescribed value. The method in particular involves induction heating for heating the rolling element, and corrects the deformation of the rolling element by treating the rolling element for a time not exceeding 30 seconds at a degree of working ranging from 0.2 to the upper limit δ. Hence, according to the corrective tempering methods of the invention, corrective tempering can be completed within such an extremely short time as not exceeding 6 minutes in order to achieve a correcting degree of deformation of 60 % or more for inner and outer diameter deformations, a dimension standardizing rate of 30% or more for the inner and outer diameters, a corrected surface roughness of less than Ra 0.2 μm, and a surface hardness of HRC 56 or more. In addition, only a small number of tools and molds are required for a mass production of rolling elements, which is another advantage. Therefore, the invention is suitably applied to a highly efficient mass production of long-life and highly accurate rolling elements such as the inner and outer races as well as cages of rolling bearings. The corrective tempering apparatus for rolling elements according to the invention is characterized in that not only the induction heater is included as a heating source for heating a hardened rolling element to a desired temperature, but also the mold temperature adjusting device for adjusting the temperature of a mold that binds the rolling element is arranged. As a result of this construction, the rolling element can be treated within such an extremely short time as not exceeding 30 seconds through direct induction heating. In addition, fitting dimensions between the mold and the rolling element can be adjusted by freely controlling the mold temperature using the mold temperature adjusting device. Therefore, the rolling element can be set in and taken out of the mold easily as well as quickly. Hence, the corrective tempering apparatus of the invention can complete corrective tempering within such an extremely short time as not exceeding 30 seconds in order to achieve a correcting degree of deformation of 60 % or more for inner and outer diameter deformations, a dimension standardizing rate of 30% or more for the inner and outer diameters, a corrected surface roughness of less than Ra 0.2 μm, and a surface hardness of HRC 56 or more. In addition, only a small number of tools and molds are required for a mass production of rolling elements, which is another advantage. Therefore, the invention is suitably applied to a highly efficient mass production of long-life and highly accurate rolling elements such as the inner and outer races as well as cages of rolling bearings.

What is claimed is:

1. An apparatus for correctively tempering a bearing component, comprising:

an induction heater heating the bearing component to a desired temperature and including a heating coil;

a mold made of ceramic material constraining at least one of an inner surface, an outer surface and both of end faces of the bearing component, the bearing component being at least one of a hardened cylindrical body, a hardened annular body and a hardened flat shaped body; and a mold temperature adjusting device arranged relative to the heating coil for adjusting a temperature of said mold by being in contact with an outer peripheral surface of said mold, said mold temperature adjusting device being positioned outside the heating coil in at least one direction of a radial direction and an axial direction of the heating coil wherein said mold temperature adjusting device is disposed apart from said heating coil.

2. The apparatus according to claim 1, in which said mold temperature adjusting device is arranged outside said heating coil in the radial direction.

3. The apparatus according to claim 1, wherein said mold temperature adjusting device adjusts the temperature of said mold by heating and cooling said mold.

4. The apparatus according to claim 1, wherein said mold temperature adjusting device comprising:

a conducting member for conducting heat, the conducting member being in contact with the outer peripheral surface of said mold; and a temperature adjusting source for heating and cooling said mold.

5. The apparatus according to claim 4, wherein said conducting member is made of a steel panel.

6. The apparatus according to claim 4, wherein said mold temperature adjusting device further comprising a temperature sensor incorporated therein.

* * * * *